US012804761B2

(12) United States Patent
Hwang

(10) Patent No.: US 12,804,761 B2
(45) Date of Patent: Nov. 17, 2026

(54) DEVICE AND METHOD FOR SUPPORTING CONTROL PLANE SIGNALING IN INTEGRATED BACKHAUL AND ACCESS SYSTEM

(71) Applicant: Samsung Electronics Co., Ltd., Gyeonggi-do (KR)

(72) Inventor: June Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 408 days.

(21) Appl. No.: 18/259,474

(22) PCT Filed: Dec. 29, 2021

(86) PCT No.: PCT/KR2021/020207
§ 371 (c)(1),
(2) Date: Jun. 27, 2023

(87) PCT Pub. No.: WO2022/146044
PCT Pub. Date: Jul. 7, 2022

(65) Prior Publication Data

US 2024/0064850 A1 Feb. 22, 2024

(30) Foreign Application Priority Data

Dec. 29, 2020 (KR) ........................ 10-2020-0186776
Jan. 14, 2021 (KR) ........................ 10-2021-0005388
Mar. 5, 2021 (KR) ........................ 10-2021-0029663

(51) Int. Cl.
*H04W 76/27* (2018.01)
*H04W 88/08* (2009.01)

(52) U.S. Cl.
CPC .......... *H04W 76/27* (2018.02); *H04W 88/085* (2013.01)

(58) Field of Classification Search
CPC ............... H04W 76/27; H04W 88/085; H04W 28/0278; H04W 28/0268; H04W 84/047;
(Continued)

(56) References Cited

U.S. PATENT DOCUMENTS 11,412,519 B2 8/2022 Malkamäki et al.
2021/0029624 A1 1/2021 Liu et al.
(Continued)

FOREIGN PATENT DOCUMENTS

KR 10-2020-0110690 9/2020
KR 10-2020-0139261 12/2020
(Continued)

OTHER PUBLICATIONS

Qualcomm Incorporated (Email Discussion Rapporteur), "[Post111-e][903][eIAB] Topology Adaptation Enhancements RAN2 Scope", R2-2009292, 3GPP TSG-RAN WG2 Meeting #112-e, Nov. 2-13, 2020, 90 pages.
(Continued)

*Primary Examiner* — Will W Lin
(74) *Attorney, Agent, or Firm* — The Farrell Law Firm, P.C.

(57) ABSTRACT

According to an embodiment of the disclosure, a method of operating an integrated access and backhaul (IAB) node in a wireless communication system includes transmitting a first radio resource control (RRC) message including a first F1 control plane (F1-C) packet to a non-donor node of the IAB node or receiving a second RRC message including a second F1-C packet from the non-donor node of the IAB node, wherein the first F1-C packet is sent to a donor node from the IAB node through the non-donor node, and the second F1-C packet is sent to the donor node from the IAB node through the non-donor node.

13 Claims, 13 Drawing Sheets

(58) Field of Classification Search
CPC ...... H04W 76/15; H04W 40/22; H04L 5/001; H04L 5/0053
See application file for complete search history.

(56) References Cited

U.S. PATENT DOCUMENTS

| | | | | |
|---|---|---|---|---|
| 2021/0211926 | A1* | 7/2021 | Han | H04W 28/0268 |
| 2021/0259051 | A1 | 8/2021 | Latheef et al. | |
| 2021/0321467 | A1* | 10/2021 | Hampel | H04W 72/20 |
| 2021/0377802 | A1* | 12/2021 | Liu | H04W 28/0862 |
| 2022/0078872 | A1* | 3/2022 | Shrestha | H04W 68/12 |
| 2022/0104306 | A1* | 3/2022 | Shrestha | H04L 1/1812 |
| 2022/0225209 | A1* | 7/2022 | Zhu | H04W 40/248 |
| 2023/0007565 | A1* | 1/2023 | Mildh | H04W 40/24 |
| 2023/0164617 | A1* | 5/2023 | Barac | H04W 76/15 370/328 |
| 2023/0164684 | A1* | 5/2023 | Diao | H04W 48/12 455/434 |
| 2023/0262600 | A1* | 8/2023 | Wallentin | H04W 36/0088 370/311 |
| 2023/0403617 | A1* | 12/2023 | Wu | H04W 36/362 |

FOREIGN PATENT DOCUMENTS

| | | |
|---|---|---|
| KR | 10-2020-0139783 | 12/2020 |
| KR | 1020220095060 | 7/2022 |
| WO | WO 2020/198357 | 10/2020 |

OTHER PUBLICATIONS

ZTE, "Discussion on Topology Redundancy", R3-210717, 3GPP TSG-RAN WG3 #111-e, Jan. 25-Feb. 4, 2021, 11 pages.
European Search Report dated May 15, 2024 issued in counterpart application No. 21915841.7-1215, 11 pages.
PCT/ISA/210, International Search Report dated Apr. 7, 2022 issued in counterpart application No. PCT/KR2021/020207, 6 pages.
PCT/ISA/237, Written Opinion dated Apr. 7, 2022 issued in counterpart application No. PCT/KR2021/020207, 4 pages.
Samsung, "Summary of offline discussion on topology redundancy", 3GPP TSG-RAN WG3 #110-e R3-206857 Nov. 2-12, 2020 Online, pp. 31.
ZTE, Sanechips, "Considerations on topology adaptation enhancements", R2-2009387, 3GPP TSG-RAN WG2 Meeting #112 electronic, R2-2009387 Online, Nov. 2-13, 2020, pp. 16.
3GPP TS 37.340 V16.3.0, (Sep. 2020), pp. 81.
Samsung (Moderator), "Summary of Offline Discussion on Topology Redundancy", R3-207101, 3GPP TSG-RAN WG3 #110-e, Nov. 2-12, 2020, 29 pages.
Korean Office Action dated Jul. 8, 2026 issued in counterpart application No. 10-2021-0029663, 18 pages.

* cited by examiner

DEVICE AND METHOD FOR SUPPORTING CONTROL PLANE SIGNALING IN INTEGRATED BACKHAUL AND ACCESS SYSTEM

PRIORITY

This application is a National Phase Entry of PCT International Application No. PCT/KR2021/020207, which was filed on Dec. 29, 2021, and claims priority to Korean Patent Application Nos. 10-2020-0186776, 10-2021-0005388, and 10-2021-0029663, which were filed on Dec. 29, 2020, Jan. 14, 2021, and Mar. 5, 2021, respectively, the entire content of each of which is incorporated herein by reference.

TECHNICAL FIELD

The disclosure relates to a wireless communication system, and more particularly, to an apparatus and method for transmitting or receiving control signals in an integrated access and backhaul system.

BACKGROUND ART

To meet the explosively increasing demand with respect to wireless data traffic due to an increase in multimedia service and the commercialization of the fourth generation (4G) communication system, an effort for developing an advanced fifth generation (5G) communication system or pre-5G communication system is being made. For this reason, the 5G or pre-5G communication system is also called a beyond 4G network communication system or post long-term evolution (LTE) system. Implementation of the 5G communication system using ultra-frequency (mmWave) bands, e.g., 60 giga hertz (GHz) bands, is considered to attain higher data rates. To reduce propagation loss of radio waves and increase a transmission range of radio waves in the ultra-frequency bands, beamforming, massive multiple-input multiple-output (MIMO), Full Dimensional MIMO (FD-MIMO), array antenna, analog beamforming, and large-scale antenna techniques are under discussion. To improve system network performance, technologies for advanced small cells, cloud radio access networks (RANs), ultra-dense networks, device to device (D1d) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart home, smart buildings, smart cities, smart cars or connected cars, smart grid, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even application of a cloud Radio Access Network (cloud RAN) as the aforementioned big data processing technology may be said as an example of convergence of 5G and IoT technologies.

With the development of the aforementioned technologies and wireless communication systems, it is possible to provide various services, and there is a need for a method to provide the services effectively.

DISCLOSURE

Technical Problem

Embodiments of the disclosure provide an apparatus and method for effectively providing services in a mobile communication system.

Technical Solution

The disclosure provides a method of transmitting distributed unit (DU) part configuration information of an integrated access and backhaul (IAB) node in an IAB system in a dual connectivity condition.

According to an embodiment of the disclosure, a node in an IAB system may transmit or receive control signals generated in its DU to a central unit (CU) of a donor node by using wireless connection of a master node or secondary node of dual connection.

Advantageous Effects

According to embodiments of the disclosure, an F1 control plane (f1c) packet of a node in an integrated access and backhaul system (IAB) is transmitted or received to or from a control unit (CU) of a donor node through connection with a base station instead of direct connection with the donor node, so that reliability of the transmission or reception of the f1c packet may be increased.

BEST MODE

Figure 1:
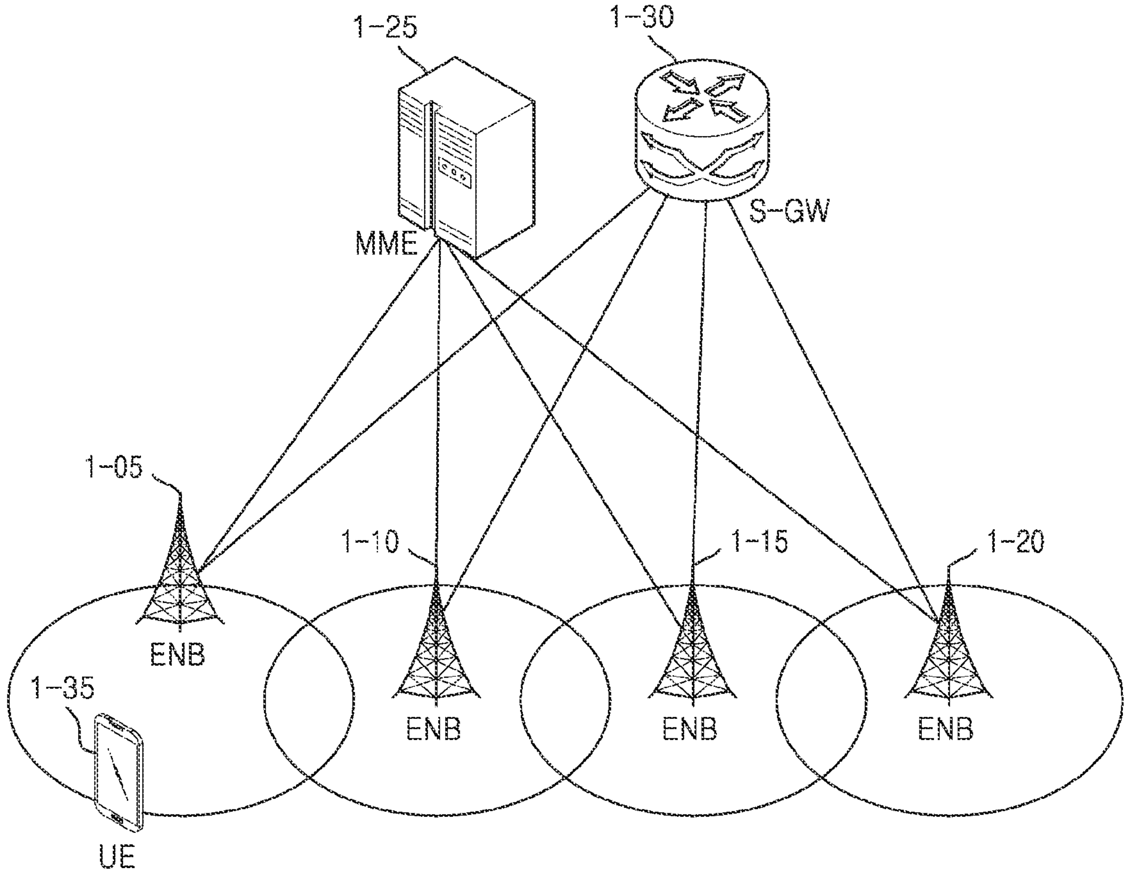
FIG. 1 illustrates a structure of a long-term evolution (LTE) system, according to an embodiment of the disclosure.

The disclosure provides a method of transmitting distributed unit (DU) part configuration information of an integrated access and backhaul (IAB) node in an IAB system in a dual connectivity condition.

According to an embodiment of the disclosure, a node in an IAB system may transmit or receive control signals generated in its DU to a central unit (CU) of a donor node by using wireless connection of a master node or secondary node of dual connection.

According to an embodiment of the disclosure, a method of operating an integrated access and backhaul (IAB) node in a wireless communication system includes transmitting a first radio resource control (RRC) message including a first F1 control plane (F1-C) packet to a non-donor node of the IAB node or receiving a second RRC message including a second F1-C packet from the non-donor node of the IAB node, wherein the first F1-C packet is sent to a donor node from the IAB node through the non-donor node, and wherein the second F1-C packet is sent to the donor node from the IAB node through the non-donor node.

In an embodiment, when the non-donor node is a master node and the donor node is a secondary node, the first RRC message and the second RRC message may be transmitted through a signaling radio bearer (SRB) 2, and when the donor node is a master node and the non-donor node is a secondary node, the first RRC message and the second RRC message may be transmitted through a split SRB 2.

In an embodiment, the first RRC message may be an uplink (UL) information transfer message, and the second RRC message may be a downlink (DL) information transfer message.

In an embodiment, the method may further include receiving, from the donor node, configuration information indicating a transmission path of at least one of the first F1-C packet or the second F1-C packet, wherein the configuration information may indicate one of a master cell group (MCG) link path, a secondary cell group (SCG) link path, or both.

In an embodiment, the method may further include receiving, from the donor node, information indicating whether a backhaul radio link control (RLC) channel is to be used or an RRC message is to be used in transmitting the first F1-C packet or receiving the second F1-C packet.

According to an embodiment of the disclosure, a method of operating an IAB non-donor node in a wireless communication system includes receiving a first RRC message including a first F1-C packet from an IAB node, wherein, when the IAB non-donor node is a master node and an IAB donor node is a secondary node, the method includes transmitting the first F1-C packet to the IAB donor node based on the received first RRC message, receiving a second F1-C packet from the IAB donor node, and transmitting a second RRC message including the second F1-C packet to the IAB node, and wherein, when the IAB donor node is a master node and the IAB non-donor node is a secondary node, the method includes transmitting a first packet data convergence protocol (PDCP) protocol data unit (PDU) including the first RRC message to the IAB donor node based on the received first RRC message, receiving a second PDCP PDU including the second RRC message including the second F1-C packet from the IAB donor node, and transmitting the second RRC message including the second F1-C packet to the IAB node.

In an embodiment, when the IAB non-donor node is a master node and the IAB donor node is a secondary node, the first RRC message and the second RRC message may be transmitted through a signaling radio bearer (SRB) 2, and when the IAB donor node is a master node and the IAB non-donor node is a secondary node, the first RRC message and the second RRC message may be transmitted through a split SRB 2.

In an embodiment, the first RRC message may be a UL information transfer message, and the second RRC message may be a DL information transfer message.

In an embodiment, the IAB node may receive, from the IAB donor node, configuration information indicating a transmission path of at least one of the first F1-C packet or the second F1-C packet, and the configuration information may indicate one of an MCG link path, an SCG link path, or both.

In an embodiment, the IAB node may receive, from the IAB donor node, information indicating whether a backhaul RLC channel is to be used or an RRC message is to be used in transmitting the first F1-C packet or receiving the second F1-C packet.

According to an embodiment of the disclosure, a method of operating an IAB donor node in a wireless communication system includes receiving a first F1-C packet or a first PDCP PDU including the first F1-C packet from an IAB non-donor, or transmitting a second F1-C packet or a second PDCP PDU including the second F1-C packet to the IAB non-donor node, wherein the first F1-C packet is obtained by the IAB non-donor receiving a first RRC message including the first F1-C packet from an IAB node, wherein the first PDCP PDU including the first F1-C packet is obtained by the IAB non-donor receiving the first PDCP PDU including the first F1-C packet from an IAB node, wherein the second F1-C packet is sent to the IAB node by the IAB non-donor transmitting a second RRC message including the second F1-C packet to the IAB node, and wherein the second PDCP PDU including the second F1-C packet is sent to the IAB node by the IAB non-donor transmitting the second PDCP PDU including the second F1-C packet.

In an embodiment, when the IAB non-donor node is a master node and the IAB donor node is a secondary node, the first RRC message and the second RRC message may be transmitted through an SRB 2, and when the IAB donor node is a master node and the IAB non-donor node is a secondary node, the first RRC message and the second RRC message may be transmitted through a split SRB 2.

In an embodiment, the first RRC message may be a UL information transfer message, and the second RRC message may be a DL information transfer message.

In an embodiment, the method may further include transmitting, to the IAB node, configuration information indicating a transmission path of at least one of the first F1-C packet or the second F1-C packet, wherein the configuration information may indicate one of an MCG link path, an SCG link path, or both.

In an embodiment, the method may further include transmitting, to the IAB node, information indicating whether a backhaul RLC channel is to be used or an RRC message is to be used in transmitting the first F1-C packet or receiving the second F1-C packet.

MODE FOR INVENTION

Operating principles of embodiments of the disclosure will now be described with reference to accompanying drawings. Descriptions of some well-known technologies that possibly obscure the disclosure will be omitted, if necessary. Further, the terms, as will be mentioned later, are defined by taking functionalities in the disclosure into account, but may vary depending on practices or intentions of users or operators. Accordingly, the terms should be defined based on descriptions throughout this specification.

Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

Some of the terms and names defined by the 3rd generation partnership project long term evolution (3GPP LTE) will be used hereinafter. The disclosure is not, however, limited to the terms and definitions, and may equally apply to any systems that conform to other standards. In the disclosure, eNode B (eNB) may be interchangeably used with gNode B (gNB). For example, a base station referred to as an eNB may also indicate a gNB. Furthermore, the term ‘terminal’ or ‘UE’ may refer not only to a cell phone, an NB-IoT device, and a sensor but also to another wireless communication device.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Same numbers refer to same elements throughout the specification.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term “module” (or sometimes “unit”) as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Descriptions of some well-known technologies that possibly obscure the disclosure will be omitted, if necessary.

Embodiments of the disclosure will now be described with reference to accompanying drawings.

Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense. For example, a terminal as herein used may refer to an MAC entity in a terminal present in each of a master cell group (MCG) and a secondary cell group (SCG).

In the following description, a base station is an entity for performing resource allocation for a terminal, and may be at least one of a gNB, an eNB, a Node B, a base station (BS), a radio access unit, a base station controller, or a network node. The terminal may include a user equipment (UE), a mobile station (MS), a cellular phone, a smart phone, a computer, or a multimedia system capable of performing a communication function. It is, of course, not limited thereto.

Especially, the disclosure may be applied to the 3GPP new radio (NR) (which is the 5G mobile communication standard). The disclosure may be applied to intelligent services based on the 5G communication and IoT related technologies, e.g., smart homes, smart buildings, smart cities, smart cars, connected cars, health care, digital education, smart retail, and security and safety services. In the disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to other wireless communication devices.

Wireless communication systems are evolving from early systems that provide voice-oriented services to broadband wireless communication systems that provide high data rate and high-quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra-mobile broadband (UMB), and IEEE 802.16e communication standards.

As a representative example of such a broadband wireless communication system, an LTE system adopts orthogonal frequency division multiplexing (OFDM) for a downlink (DL) and single carrier frequency division multiple access (SC-FDMA) for an uplink (UL). The UL refers to a radio link for a UE or MS to send data or a control signal to an eNode B or BS, and the DL refers to a radio link for a BS to send data or a control signal to a UE or MS. Such a multiple access scheme allocates and operates time-frequency resources for carrying data or control information for respective users not to overlap each other, i.e., to maintain orthogonality, thereby differentiating each user's data or control information.

As a future communication system after the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLL), etc.

In some embodiments, the eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Furthermore, the 5G communication system may need to provide an increasing user perceived data rate while providing the peak data rate. To satisfy these requirements, enhancement of various technologies for transmission or reception including multiple-input multiple-output (MIMO) transmission technologies may be required in the 5G communication system. While the present LTE uses up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of terminals in a cell, enhanced coverage of the terminal, extended battery time, reduction in terminal price, etc., may be required. Because the IoT is equipped in various sensors and devices to provide communication functions, it may be supposed to support a large number of UEs in a cell (e.g., 1,000,000 terminals/km$^2$). Furthermore, a UE supporting the mMTC is more likely to be located in a shadow area, such as a basement of a building, which might not be covered by a cell due to the nature of the service, so the mMTC may require an even larger coverage than expected for other services provided by the 5G communication system. The UE supporting the mMTC needs to be a low-cost terminal, and may require quite a long battery life time such as 10 to 15 years because it is difficult to frequently change the battery in the UE.

Finally, the URLLC may be a mission-critical cellular based wireless communication service, which may be used for services used for remote control over robots or machinery, industrial automation, unmanned aerial vehicle, remote health care, emergency alert, etc. Accordingly, communication offered by the URLLC may require very low latency (ultra-low latency) and very high reliability. For example, URLCC services may need to satisfy sub-millisecond (less than 0.5 millisecond) air interface latency and simultaneously require a packet error rate equal to or lower than $10^{-3}$. Hence, for the URLLC services, the 5G system needs to provide a smaller transmit time interval (TTI) than for other services, and simultaneously requires a design that allocates a wide range of resources for a frequency band to secure reliability of the communication link.

Those three services considered in the aforementioned 5G communication system, i.e., eMBB, URLLC, and mMTC, may be multiplexed and transmitted from a single system. In this case, to meet different requirements for the three services, different transmission or reception schemes and parameters may be used between the services. The mMTC, URLLC, and eMBB are an example of different types of services, and embodiments of the disclosure are not limited to the service types.

Although the following embodiments of the disclosure will now be focused on an LTE, LTE-A, LTE Pro or 5G (or NR, next generation mobile communication) system for example, they may be equally applied to other communication systems with similar technical backgrounds or channel types. Furthermore, embodiments of the disclosure will also be applied to different communication systems with some modifications to such an extent that they do not significantly deviate from the scope of the disclosure when judged by those of ordinary skill in the art.

FIG. 1 illustrates a structure of a long-term evolution (LTE) system, according to an embodiment of the disclosure.

Referring to FIG. 1, a radio access network of the LTE system may include evolved Node Bs (hereinafter, also referred to as ENBs, Node Bs, or BSs) 1-05, 1-10, 1-15, and 1-20, a mobility management entity (MME) 1-25, and a serving gateway (S-GW) 1-30. A UE (or terminal) 1-35 may access an external network via the ENB 1-05 to 1-20 and the S-GW 1-30.

In FIG. 1, the ENBs 1-05 to 1-20 may correspond to the existing node Bs in a universal mobile telecommunication system (UMTS). The ENB may be connected to the UE 1-35 via a wireless channel, and may play a more sophisticated role than the existing node B does. In the LTE system, all user traffic including real-time services such as Voice over IP (VoIP) through the Internet protocol may be served on shared channels. Accordingly, there may be a need for a device to aggregate status information about buffer status of UEs, available transmission power status, a channel condition, etc., and schedule them, and the ENBs 1-05 to 1-20 may serve as the device. A single ENB may generally control a plurality of cells. To achieve e.g., 100 Mbps of transmission speed, the LTE system may use orthogonal frequency division multiplexing (OFDM) in e.g., 20 MHz of bandwidth as a radio access technology. Furthermore, the ENB may apply an adaptive modulation and coding (AMC) scheme that determines a modulation scheme and channel coding rate according to a channel condition of the UE. The S-GW 1-30 may be a device to provide data bearers, producing or eliminating data bearers under the control of the MME 1-25. The MME is a device responsible for various control functions as well as a mobility management function for the UE, and may be connected to a plurality of BSs.

Figure 2:
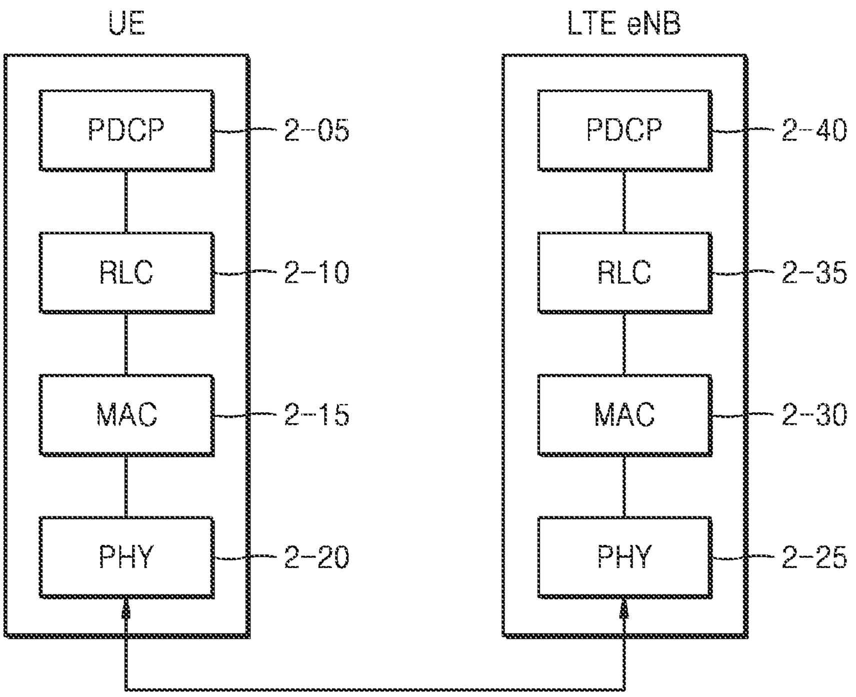
FIG. 2 illustrates a radio protocol architecture of an LTE system, according to an embodiment of the disclosure.

FIG. 2 illustrates a radio protocol architecture of an LTE system, according to an embodiment of the disclosure.

Referring to FIG. 2, the radio protocol for an LTE system may include, for each of the UE and the ENB, a packet data convergence protocol (PDCP) 2-05 or 2-40, a radio link control (RLC) 2-10 or 2-35, a medium access control (MAC) 2-15 or 2-30, and a physical (PHY) device (or layer) 2-20 or 2-25. Obviously, it is not limited thereto, but it may include fewer or more devices.

According to an embodiment of the disclosure, the PDCP may be responsible for operations such as IP header compression/reconstruction. The main functions of the PDCP may be summarized as follows: It is, of course, not limited thereto.

- header compression and decompression function (e.g., header compression and decompression: robust header compression (ROHC) only)
- user data transfer function
- sequential delivery function (e.g., in-sequence delivery of higher layer Packet Data Units (PDUs) at PDCP re-establishment procedure for RLC acknowledged mode (AM))
- reordering function (e.g., for split bearers in DC (only support for RLC AM): PDCP PDU routing for transmission and PDCP PDU reordering for reception)
- duplicate detection function (e.g., duplicate detection of lower layer SDUs at PDCP re-establishment procedure for RLC AM)
- retransmission function (e.g., retransmission of PDCP SDUs at handover and, for split bearers in DC, of PDCP PDUs at PDCP data-recovery procedure, for RLC AM)
- ciphering and deciphering function
- timer-based SDU discarding function (e.g., timer-based SDU discarding in uplink)

In an embodiment, the RLC 2-10 or 2-35 may reconfigure a PDCP PDU into a suitable size to perform e.g., an automatic repeat request (ARQ) operation. The main functions of the RLC may be summarized as follows: It is, of course, not limited thereto.

- data transfer function (e.g., transfer of upper layer PDUs)
- ARQ function (e.g., Error Correction through ARQ (only for AM data transfer))
- concatenation, segmentation, and reassembling function (e.g., concatenation, segmentation and reassembly of RLC SDUs (only for UM and AM data transfer))
- re-segmentation function (e.g., re-segmentation of RLC data PDUs (only for AM data transfer))
- reordering function (e.g., reordering of RLC data PDUs (only for UM and AM data transfer))
- duplicate detection function (e.g., duplicate detection (only for UM and AM data transfer))
- error detection function (e.g., protocol error detection (only for AM data transfer))
- RLC SDU discard function (e.g., RLC SDU discard (only for UM and AM data transfer))
- RLC re-establishment function In an embodiment, the MAC layer 2-15 or 2-30 may be connected to a number of RLC layer devices configured in a single UE, for multiplexing RLC PDUs to a MAC PDU and demultiplexing RLC PDUs from a MAC PDU. The main functions of the MAC layer may be summarized as follows: It is, of course, not limited to the following example.

- mapping function (e.g., mapping between logical channels and transport channels)
- multiplexing and demultiplexing function (e.g., multiplexing/demultiplexing of MAC SDUs belonging to one or different logical channels into/from transport blocks (TB) delivered to/from the physical layer on transport channels)
- scheduling information report function
- HARQ function (e.g., error correction through HARQ)
- logical channel priority control function (e.g., priority handling between logical channels of one UE)
- UE priority control function (e.g., priority handling between UEs by means of dynamic scheduling)
- MBMS service identification function
- transport format selection function
- padding function In an embodiment, a PHY layer 2-20 or 2-25 may perform channel coding and modulation on higher layer data, form the data into OFDM symbols and transmit them on a radio channel, or may demodulate OFDM symbols received on a radio channel, perform channel decoding on them and send the result to a higher layer. It is, of course, not limited thereto.

Figure 3:
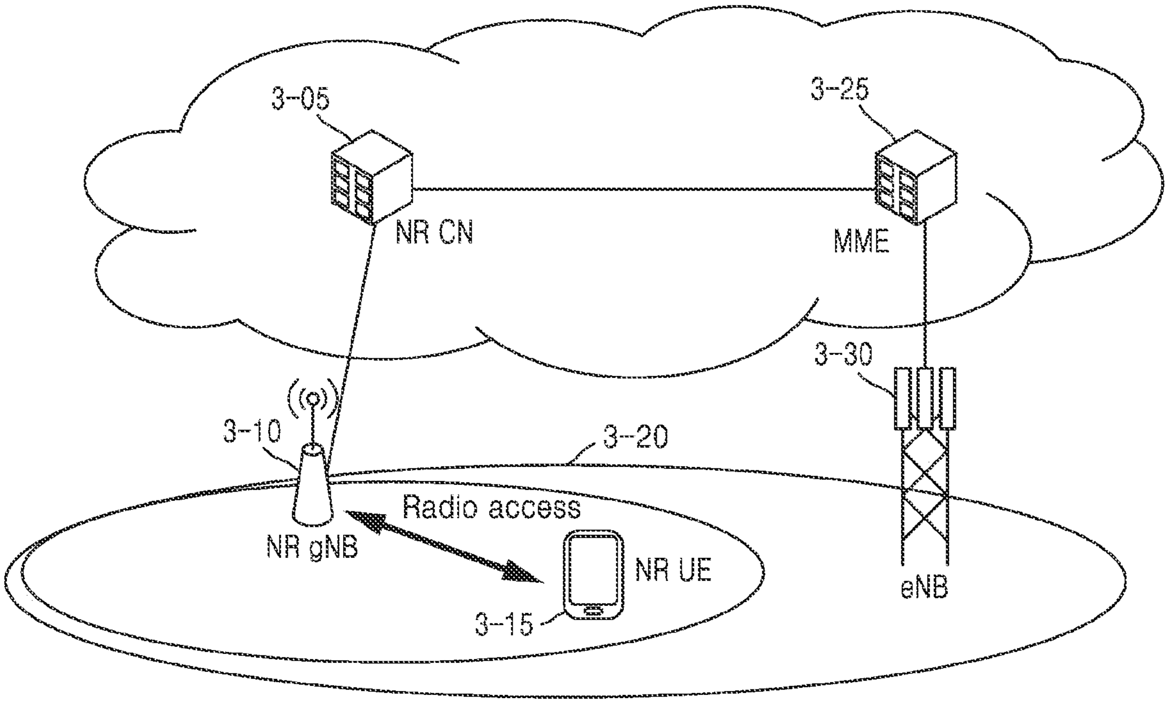
FIG. 3 illustrates a structure of a next generation mobile communication system, according to an embodiment of the disclosure.

FIG. 3 illustrates a structure of a next generation mobile communication system, according to an embodiment of the disclosure.

Referring to FIG. 3, a radio access network of the next generation mobile communication (hereinafter, NR or 5 g) system may include a new radio node B, hereinafter, referred to as an NR gNB or NR BS 3-10, and a new radio core network (NR CN) 3-05. A new radio user equipment (NR UE or Terminal) 3-15 may access an external network through the NR gNB 3-10 and the NR CN 3-05.

In FIG. 3, the NR gNB 3-10 may correspond to an evolved Node B (eNB) of the existing LTE system. The NR gNB 3-10 may be connected to the NR UE 3—on a radio channel and may provide much better services than the existing node B does. In the NR system, all user traffic may be served on shared channels. Accordingly, there may be a need for a device to aggregate information about buffer status of UEs, available transmission power status, a channel condition, etc., and schedule them, and the NR gNB 3-10 may serve as the device. A single NR gNB 3-10 may control a plurality of cells. In the NR system, to achieve ultra-high-speed data transmission compared to the current LTE, bandwidth greater than the current maximum bandwidth may be applied. Furthermore, OFDM may be used as a radio access technology, and a beamforming technology may be additionally used.

Furthermore, in some embodiments, the NR gNB may employ an adaptive modulation and coding (AMC) scheme that determines a modulation scheme and channel coding rate according to a channel condition of the UE. The NR CN 3-05 may perform such functions as supporting mobility, setting up a bearer, setting quality of service (QoS), etc. The NR CN 3-05 is a device responsible for various control functions as well as mobility management functionality for the UE, and may be connected to a number of BSs. Moreover, the NR system may cooperate with the existing LTE system, in which case the NR CN may be connected to an MME 3-25 through a network interface. The MME may be connected to an existing BS, eNB 3-30.

Figure 4:
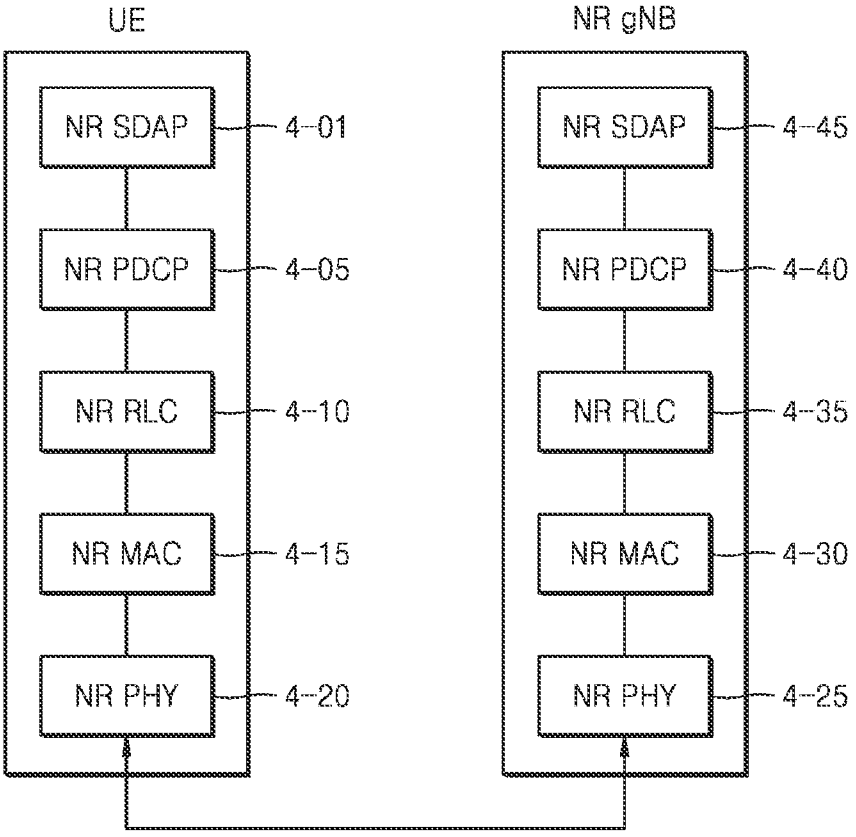
FIG. 4 illustrates a radio protocol architecture of a next generation mobile communication system, according to an embodiment of the disclosure.

FIG. 4 illustrates a radio protocol architecture of an NR system, according to an embodiment of the disclosure.

Referring to FIG. 4, a radio protocol for the NR system may include, for each of a UE and an NR gNB, an NR service data adaptation protocol (SDAP) 4-01 or 4-45, an NR PDCP 4-05 or 4-40, an NR RLC 4-10 or 4-35, an NR MAC 4-15 or 4-30, and an NR PHY 4-20 or 4-25 device (or layer). Obviously, it is not limited thereto, but it may include fewer or more devices.

In an embodiment, main functions of the NR SDAP 4-01 or 4-45 may include some of the following functions: It is, of course, not limited to the following example.

- transfer of user plane data
- mapping between a QoS flow and a data bearer (DRB) for both DL and UL
- function of marking QoS flow identification (ID) for both UL and DL
- function of mapping of a reflective QoS flow to a DRB for UL SDAP PDUs.

For an SDAP layer device, the UE may receive configuration of whether to use a header of the SDAP layer device or whether to use a function of the SADP layer device for each PDCP layer device, each bearer or each logical channel in a radio resource control (RRC) message. When the SDAP layer device is configured with an SDAP header, a 1-bit non-access stratum (NAS) reflective QoS (NAS reflective QoS) indicator and a 1-bit access stratum (AS) reflective QoS (AS reflective QoS) indicator may indicate for the UE to update or reconfigure the mapping information between the UL and DL QoS flow and the data bearer. In some embodiments, the SDAP header may include QoS flow ID information indicating QoS. In some embodiments, the QoS information may be used for data process priority, scheduling, etc., for smoother services.

In an embodiment, main functions of the NR PDCP 4-05 or 4-40 may include some of the following functions: It is, of course, not limited to the following example.

- header compression and decompression function (e.g., header compression and decompression: robust header compression (ROHC) only)
- user data transfer function
- sequential delivery function (e.g., in-sequence delivery of upper layer PDUs)
- non-sequential delivery function (e.g., out-of-sequence delivery of upper layer PDUs)
- reordering function (e.g., PDCP PDU reordering for reception)
- duplicate detection function (e.g., duplicate detection of lower layer SDUs)
- retransmission function (e.g., retransmission of PDCP SDUs)
- ciphering and deciphering function
- timer-based SDU discarding function (e.g., timer-based SDU discarding in uplink)

In the above description, the reordering function of the NR PDCP device may refer to a function of reordering PDCP PDUs received from a lower layer based on PDCP sequence numbers (SNs). The reordering function of the NR PDCP device may include a function of delivering data to a higher layer in the reordered sequence or delivering the data directly to the higher layer without considering the sequence, a function of reordering the sequence to record missing PDCP PDUs, a function of reporting status of missing PDCP PDUs to a transmitting end, or a function of requesting retransmission of missing PDCP PDUs.

In some embodiments, main functions of the NR RLC 4-10 or 4-5 may include some of the following functions: It is not, however, limited to the following example.

- data transfer function (e.g., transfer of upper layer PDUs)
- sequential delivery function (e.g., in-sequence delivery of upper layer PDUs)
- non-sequential delivery function (e.g., out-of-sequence delivery of upper layer PDUs)
- ARQ function (e.g., error correction through ARQ)
- concatenation, segmentation, and reassembling function (e.g., concatenation, segmentation and reassembly of RLC SDUs)
- re-segmentation function (e.g., re-segmentation of RLC data PDUs)
- reordering function (e.g., reordering of RLC data PDUs)
- duplicate detection function
- error detection function (e.g., protocol error detection)
- RLC SDU discard function
- RLC re-establishment function In the aforementioned description, the sequential delivery function of the NR RLC device may refer to a function of delivering RLC SDUs received from a lower layer to a higher layer in sequence. When several RLC SDUs split from an original RLC SDU are received, the sequential (in-sequence) delivery of the NR RLC device may include a function of re-assembling them and delivering the result.

The sequential delivery function of the NR RLC device may include a function of reordering the received RLC PDUs based on RLC sequence numbers (SNs) or PDCP SNs, a function of reordering the sequence to record missing RLC PDUs, a function of reporting status of missing RLC PDUs to a transmitting end, or a function of requesting retransmission of missing PDCP PDUs.

The sequential delivery function of the NR RLC device may include, when there is a missing RLC SDU, a function of delivering only RLC SDUs before the missing RLC SDU to a higher layer in sequence.

The sequential delivery function of the NR RLC device may include, when a certain timer has been expired even though there is a missing RLC SDU, a function of delivering all the received RLC SDUs to a higher layer in sequence before the timer is started.

The sequential delivery function of the NR RLC device may include, when a certain timer has been expired even though there is a missing RLC SDU, a function of delivering all the RLC SDUs received until the present time to a higher layer in sequence.

The NR RLC device may process the RLC PDUs out of sequence from the sequence numbers but in reception order, and deliver the result to the NR PDCP device.

When receiving segments, the NR RLC device may receive segments stored in the buffer or segments received later and reassemble them into a complete RLC PDU, and deliver the RLC PDU to the NR PDCP device.

The NR RLC layer may not include the concatenation function, and the concatenation function may be performed in the NR MAC layer or replaced with the multiplexing function of the NR MAC layer.

In the aforementioned description, the non-sequential delivery (out-of-sequence delivery) function of the NR RLC device may refer to a function of delivering RLC SDUs received from a lower layer directly to a higher layer without regard to the sequence of the RLC SDUs. The non-sequential delivery function of the NR RLC device may include, when several RLC SDUs split from an original RLC SDU is received, a function of reassembling them and delivering the result. The non-sequential delivery function of the NR RLC device may include a function of storing RLC SNs or PDCP SNs of the received RLC PDUs and ordering the sequence to record missing RLC PDUs.

In some embodiments, the NR MAC 4-15 or 4-30 may be connected to multiple NR RLC layer devices configured in the same UE, and main functions of the NR MAC may include some of the following functions: It is, of course, not limited to the following example.

- mapping function (e.g., mapping between logical channels and transport channels)
- multiplexing and demultiplexing function (e.g., multiplexing/demultiplexing of MAC SDUs)
- scheduling information report function
- HARQ function (e.g., error correction through HARQ)
- logical channel priority control function (e.g., priority handling between logical channels of one UE)
- UE priority control function (e.g., priority handling between UEs by means of dynamic scheduling)
- MBMS service identification function
- transport format selection function
- padding function The NR PHY layer 4-20 or 4-25 may perform channel coding and modulation on higher layer data, form the data into OFDM symbols and send them on a radio channel, or may demodulate OFDM symbols received on a radio channel, perform channel decoding on them and send the result to a higher layer. It is, of course, not limited to the following example.

Figure 5:
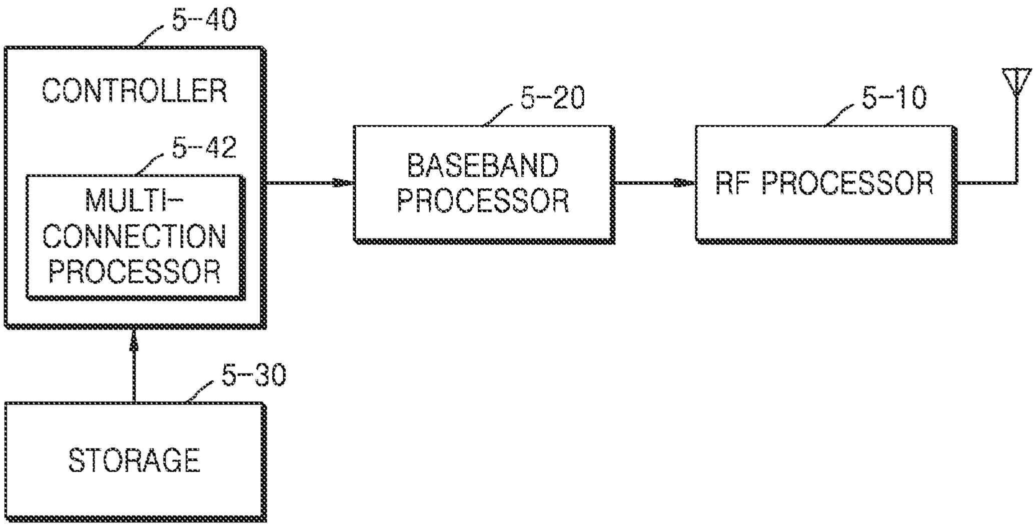
FIG. 5 is a block diagram illustrating an internal structure of a user equipment (UE), according to an embodiment of the disclosure.

FIG. 5 is a block diagram illustrating an internal structure of a UE, according to an embodiment of the disclosure.

Referring to FIG. 5, a UE may include a radio frequency (RF) processor 5-10, a baseband processor 5-20, a storage 5-30, and a controller 5-40. Furthermore, the controller 5-40 may further include a multi-connection processor 5-42. It is, of course, not limited thereto, and the UE may include more or fewer components than in FIG. 5

The RF processor 5-10 may perform functions, such as band conversion, amplification, etc., of a signal to transmit or receive the signal on a radio channel. Specifically, the RF processor 5-10 may up-convert a baseband signal provided from the baseband processor 5-20 to an RF band signal for transmission through an antenna, and down-convert an RF band signal received through the antenna to a baseband signal. For example, the RF processor 5-10 may include a transmit filter, a receive filter, an amplifier, a mixer, an oscillator, a digital to analog converter (DAC), an analog to digital converter (ADC), etc. It is, of course, not limited thereto. Although only one antenna is shown in FIG. 5, the UE may be equipped with a plurality of antennas. The RF processor 5-10 may also include a plurality of RF chains. Furthermore, the RF processor 5-10 may perform beamforming. For beamforming, the RF processor 5-10 may control the phase and amplitude of each signal to be transmitted or received through a plurality of antennas or antenna elements. Furthermore, the RF processor 5-10 may perform multiple-input-multiple-output (MIMO), and may receive a number of layers during the MIMO operation.

The baseband processor 5-20 performs conversion between a baseband signal and a bit sequence based on a physical layer standard of the system. For example, for data transmission, the baseband processor 5-20 generates complex symbols by encoding and modulating a bit sequence for transmission. Furthermore, when data is received, the baseband processor 5-20 may reconstruct a received bit sequence by demodulating and decoding the baseband signal provided from the RF processor 5-10. For example, in a case of conforming to an OFDM scheme, for data transmission, the baseband processor 5-20 generates complex symbols by encoding and modulating a bit sequence for transmission, maps the complex symbols to subcarriers, and performs inverse fast Fourier transform (IFFT) operation and cyclic prefix (CP) insertion to construct OFDM symbols. Furthermore, for data reception, the baseband processor 5-20 may divide a baseband signal provided from the RF processor 5-10 into OFDM symbol units, reconstruct the signals mapped to the subcarriers through fast Fourier transform (FFT) and then reconstruct a received bit sequence through demodulation and decoding.

The baseband processor 5-20 and the RF processor 5-10 transmit and receive signals as described above. The baseband processor 5-20 and the RF processor 5-10 may be referred to as a transmitter, a receiver, a transceiver, or a communicator. Further, at least one of the baseband processor 5-20 and the RF processor 5-10 may include many different communication modules to support many different radio access technologies. Furthermore, at least one of the baseband processor 5-20 and the RF processor 5-10 may include different communication modules to process different frequency band signals. For example, the different radio access technologies may include a WLAN, e.g., the IEEE 802.11, a cellular network, e.g., LTE, etc. Furthermore, the different frequency bands may include a super high frequency (SHF) band, e.g., 2.NRHz, NRhz, and millimeter wave (mmwave) band, e.g., 60 GHz. The UE may use the baseband processor 5-20 and the RF processor 5-10 to transmit or receive signals which may include control information and data.

The storage 5-30 stores a basic program for operation of the UE, an application program, data such as configuration information. In particular, the storage 5-30 may store information regarding a second access node that performs wireless communication using a second radio access technology. The storage 5-30 provides data stored therein at the request of the controller 5-40. The storage 5-30 may include a storage medium such as a read only memory (ROM), a random access memory (RAM), a hard disk, a compact disk ROM (CD-ROM), and a digital versatile disc (DVD), or a combination of storage mediums. Moreover, the storage 5-30 may include a plurality of memories.

The controller 5-40 controls general operations of the UE. For example, the controller 5-40 transmits or receives signals through the baseband processor 5-20 and the RF processor 5-10. The controller 5-40 also records or reads data onto or from the storage 5-40. For this, the controller 5-40 may include at least one processor. For example, the controller 5-40 may include a communication processor (CP) for controlling communication and an application processor (AP) for controlling a higher layer such as an application program. At least one component in the UE may be implemented in a single chip. In an embodiment of the disclosure, the controller 5-40 may control the respective components of the UE to transmit or receive control information in the IAB system. In an embodiment of the disclosure, a method of operating the UE will now be described in more detail.

Figure 6:
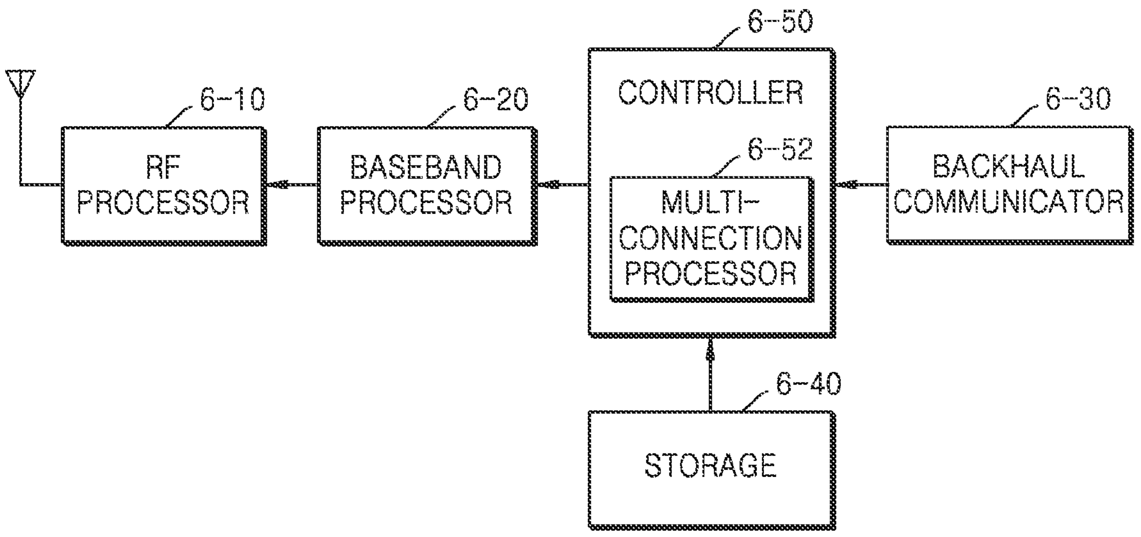
FIG. 6 is a block diagram illustrating a configuration of a new radio (NR) gNB, according to an embodiment of the disclosure.

FIG. 6 is a block diagram illustrating a configuration of an NR gNB, according to an embodiment of the disclosure.

Referring to FIG. 6, the gNB may include an RF processor 6-10, a baseband processor 6-20, a backhaul communicator 6-30, a storage 6-40, and a controller 6-50. Furthermore, the controller 6-50 may further include a multi-connection processor 6-52. It is, of course, not limited thereto, and the gNB may include more or fewer components than in FIG. 6

The RF processor 6-10 may perform functions, such as band conversion, amplification, etc., of a signal to transmit or receive the signal on a radio channel. Specifically, the RF processor 6-10 up-converts a baseband signal provided from the baseband processor 6-20 to an RF band signal for transmission through an antenna, and down-converts an RF band signal received through the antenna to a baseband signal. For example, the RF processor 6-10 may include a transmit filter, a receive filter, an amplifier, a mixer, an oscillator, a DAC, an ADC, etc. Although only one antenna is shown in FIG. 6, the RF processor 6-10 may be equipped with a plurality of antennas. The RF processor 6-10 may also include a plurality of RF chains. Furthermore, the RF processor 6-10 may perform beamforming. For beamforming, the RF processor 6-10 may control the phase and amplitude of each signal to be transmitted or received through a plurality of antennas or antenna elements. The RF processor 6-10 may perform downstream MIMO operation by transmitting one or more layers.

The baseband processor 6-20 may perform conversion between a baseband signal and a bit sequence based on a physical layer standard of a first radio access technology. For example, for data transmission, the baseband processor 6-20 may generate complex symbols by encoding and modulating a bit sequence for transmission. Furthermore, for data reception, the baseband processor 6-20 may reconstruct a received bit sequence by demodulating and decoding the baseband signal provided from the RF processor 6-10. For example, when conforming to an OFDM scheme, for data transmission, the baseband processor 6-20 may generate complex symbols by encoding and modulating a bit sequence for transmission, map the complex symbols to subcarriers, and then reconstruct OFDM symbols by IFFT operation and CP insertion. Furthermore, for data reception, the baseband processor 6-20 may divide a baseband signal provided from the RF processor 6-10 into OFDM symbol units, reconstruct the signals mapped to the subcarriers through FFT operation and then reconstruct a received bit sequence through demodulation and decoding. The baseband processor 6-20 and the RF processor 6-10 may transmit and receive signals as described above. The baseband processor 6-20 and the RF processor 6-10 may be referred to as a transmitter, a receiver, a transceiver, or a wireless communicator. The gNB may use the baseband processor 6-20 and the RF processor 6-10 to transmit or receive, to or from the UE, signals which may include control information and data.

The backhaul communicator 6-30 provides an interface for communicating with other nodes in the network. Specifically, the backhaul communicator 6-30 may convert a bit sequence to be transmitted from this primary BS to another node, e.g., a secondary BS, a core network, etc., into a physical signal, and convert a physical signal received from another node to a bit sequence. The backhaul communicator 6-30 may be included in a communication module.

The storage 6-40 stores a basic program for operation of the gNB, an application program, data such as configuration information. The storage 6-40 may store information about a bearer allocated to a connected UE, measurements reported from the UE, etc. Furthermore, the storage 6-40 may store information used as a criterion for determining whether to provide or stop multi-connection for the UE. The storage 6-40 provides data stored therein at the request of the controller 6-50. The storage 6-40 may include a storage medium such as a ROM, a RAM, a hard disk, a CD-ROM, and a DVD, or a combination of storage mediums. Moreover, the storage 6-40 may include a plurality of memories. In some embodiments, the storage 6-40 may store a program to perform a method of reporting buffer status according to the disclosure.

The controller 6-50 controls general operations of the gNB. For example, the controller 6-50 transmits or receives signals through the baseband processor 6-20 and the RF processor 6-10 or the backhaul communicator 6-30. The controller 6-50 also records or reads data onto or from the storage 6-40. For this, the controller 6-50 may include at least one processor. At least one component in the BS may be implemented in a single chip.

In an embodiment of the disclosure, the controller 6-50 may control the respective components of the gNB to transmit or receive control information in the IAB system. In an embodiment of the disclosure, a method of operating the gNB will now be described in more detail.

The disclosure may provide a method of transmitting distributed unit (DU) part configuration information of an IAB node in an IAB system in a dual connectivity condition.

Figure 7A:
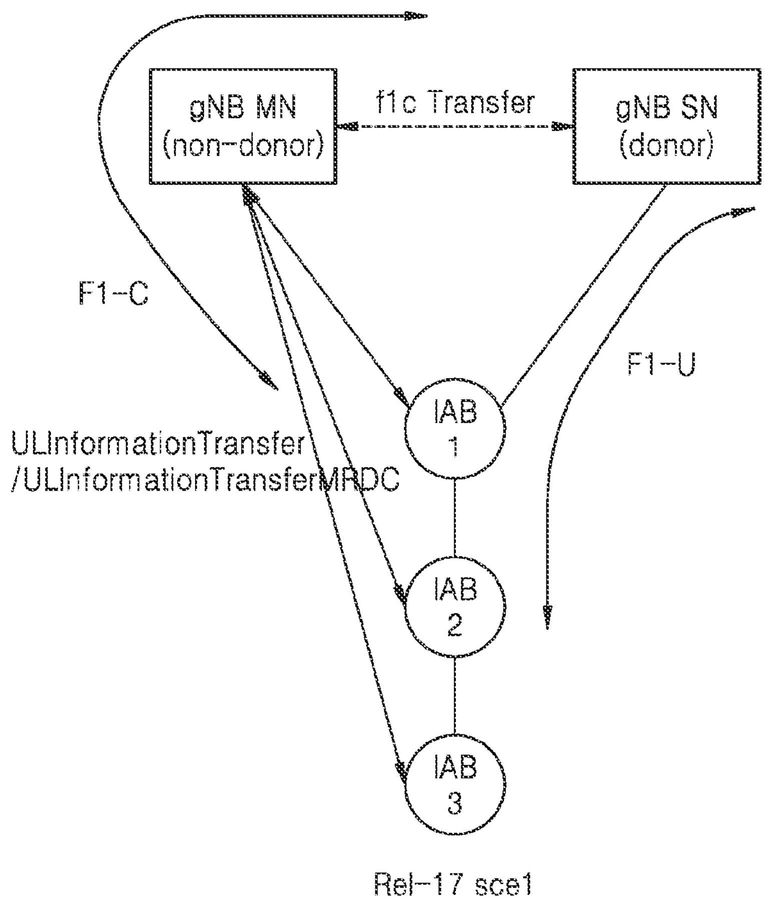
FIG. 7A illustrates a case that there are a non-donor master node (MN) and a donor secondary node (SN), according to an embodiment of the disclosure.

FIG. 7A illustrates a case of a non-donor MN and a donor SN, according to an embodiment of the disclosure.

Referring to FIG. 7A, illustrated is an occasion when f1c (F1-C) traffic may be transmitted through connection with a non-donor node when an IAB node is configured with dual connection and the MN is the non-donor node and the SN is a donor node.

Figure 7B:
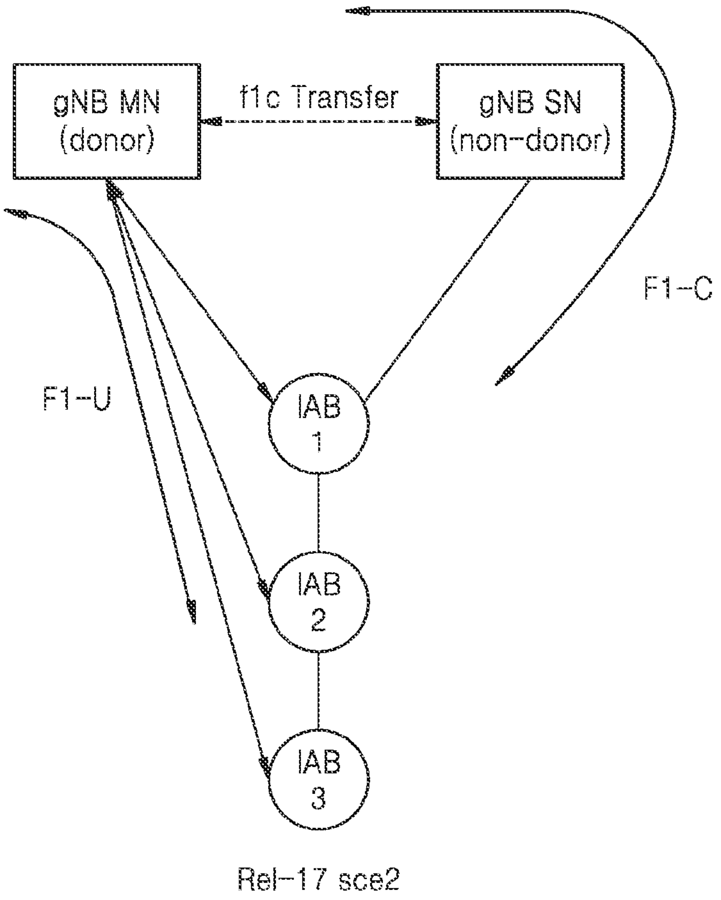
FIG. 7B illustrates a case that there are a donor MN and a non-donor SN, according to an embodiment of the disclosure.

FIG. 7B illustrates a case that there are a donor-MN and a non-donor SN, according to an embodiment of the disclosure.

Referring to FIG. 7B, illustrated is an occasion when f1c traffic may be transmitted through connection with a non-donor node when an IAB node is configured with dual connection and the MN is a donor node and the SN is the non-donor node.

In both the cases of FIGS. 7A and 7B, each IAB node may transmit f1c to an MCG or an SCG. In the case of FIG. 7A, for the transmission to the SCG, f1c traffic transmission through the existing backhaul (BH) link is possible, and in the case of FIG. 7B, for the transmission to the MCG, f1c traffic transmission through the existing BH link is possible. A message used in the other cases, i.e., in the case of FIG. 7A for transmission to the MCG and in the case of FIG. 7B for transmission to the SCG, may be formed as follows.

In an embodiment, in both cases of FIGS. 7A and 7B, an ULInformationTransfer message of NR RRC may be used for UL transmission, and a DLInformationTransfer message of NR RRC may be used for DL transmission, and the messages need to satisfy at least one of the followings:

- need to include the f1c packet as an octet string type.
- in the case of FIG. 7A, the message may be transmitted through SRB2 or SRB1 (only if SRB2 is not established yet). When SRB2 is suspended, IAB mobile termination (IAB MT) may not transmit the message until SRB2 is resumed. (If SRB2 is suspended, the LAB MT does not send this message until SRB2 is resumed.)
- in the case of FIG. 7B, the message may be transmitted through SRB3 or split SRB1/split SRB2.

In another embodiment, a ULInformationTransfer and/or DLInformationTransfer message of NR RRC may be used in the case of FIG. 7A, and ULInformationTransferMRDC and/or DLInformationTransferMRDC of NR RRC may be used in the case of FIG. 7B. Even in this case, each message may include the f1c packet as the octet string type. Besides, at least one of the followings needs to be satisfied.

- in the case of FIG. 7A, the ULInformationTransfer and/or DLInformationTransfer message may be transmitted through SRB2 or SRB1. (UL/DLInformationTransfer msg can be transferred via SRB2 or SRB1.)
- in the case of FIG. 7B, the ULInformationTransferMRDC and/or DLInformationTransferMRDC message may be transmitted through SRB3 (or split SRB1 or split SRB2). (UL/DLInformationTransferMRDC msg can be transferred via SRB3 ((또는 split SRB1/split SRB2))

In another embodiment, in both the cases of FIGS. 7A and 7B, the ULInformationTransferMRDC and DLInformationTransferMRDC message of NR RRC may be used.—each message needs to include the f1c packet as an octet string type.

- in the case of FIG. 7A, both messages may be transmitted in SRB1 or SRB2.
- in the case of FIG. 7B, both messages may be transmitted through SRB3 (or split SRB1/split SRB2).

For each case, the IAB donor node may notify each IAB node of a configuration of what link is used to send the f1c traffic. In this case, the configuration information may be transmitted in an RRC message, and as an available value, one of {mcg, scg, both} may be set. On receiving the message, the LAB node may transmit or receive f1c traffic by using a mcg link when 'mcg' is set, and by using a scg link when 'scg' is set. When 'both' is set, f1c traffic may be transmitted by using a link selected by the IAB node. The message delivering the configuration of what link is used to send the f1c traffic may be an RRCReconfiguration message of NR RRC.

When a path configuration is received, e.g., in the case of FIG. 7B, when configured with the 'scg', the NR RRC message including the f1c packet may be transmitted in SRB3 or split SRB1/split SRB2. In this case, the following operations may be required.

1. In the case of transmitting in SRB3, the SN needs to set up the SRB3 when dual connectivity (DC) is configured, specifically, when an SCG is added. (SN has to setup SRB3 when SCG is added, when DC is configured.)
2. In the case of transmission in split SRB1 or split SRB2, when DC is configured, the MN needs to set a split SRB for the corresponding SRB.

(1) when an f1c packet is generated for transmission and a primary path of the split SRB is an MCG, the IAB MT may change the primary path of the split SRB to an SCG for UL transmission.

(2) the IAB MT may also check whether the SRB is not activated as pdcp-duplication.

(3) the above two operations may be expressed as follows:

> when the MT is configured with split SRB1 or split SRB2 and PDCP-duplication is not configured for the SRB:

>> when the primary path for the PDCP entity of the corresponding SRB refers to the MCG:

>>> set the primary path to refer to the SCG (4) the above operation of changing the primary path may be performed like at least one of the followings:

when a corresponding RRC message is transmitted each time f1c UL traffic is generated, the primary path for the split SRB of the IAB MT is changed to the SCG to transmit the message upstream and after completion of the transmission, the primary path for the split SRB is changed back to the original state, i.e., one-time change is possible. Alternatively, From when it is configured that f1c traffic is to be transmitted to the SCG to the time when there is a change of the configuration, the primary path for the split SRB continues to be toward the SCG to transmit the corresponding message upstream, and when the configuration is changed from the SCG to the MCG or 'both', it may fall back to the original primary path set value.

Even though there is no path setting, the IAB MT may sort out where to transmit f1c traffic as will be described below. In such a case that no path setting is given, the MT may use a default path for the f1c traffic.

As the donor node passes down a backhaul adaptation protocol (BAP) layer configuration, the IAB MT may check the location/usage of the RRCReconfiguration message in which the BAP configuration is included to sort out whether a system in which it currently exists corresponds to the case of FIG. 7A or the case of FIG. 7B. Specifically, when the RRCReconfiguration message including the BAP configuration is sent through an MCG link and is not included in a multi-RAT dual connectivity (MRDC) secondary cell group field, the default path may be the MCG link. When the RRCReconfiguration message including the BAP configuration is sent in SRB3 through an SCG link, or when the RRCReconfiguration message is sent through the MCG link but sent in the mrdc secondary cell group field of the outer RRCReconfiguration message, the default path may be the SCG link.

In each case of FIGS. 7A and 7B, f1c traffic of an IAB node may be transmitted through a BH RLC channel using a donor node path, or an NR RRC message using a non-donor node path may be used for the f1c traffic transmission. Unlike this, in another embodiment, NR RRC may also be used on additional NR Uu instead of the existing BH RCL channel. In this case, the donor node may provide each IAB node with a configuration of whether the BH RLC channel is used or the NR RRC message is used for the f1c traffic transmission/reception using the donor node path. This configuration may also be transmitted in the RRCReconfiguration message. Likewise, values of {bh RLC CH, RRC, both} may refer to the use of BH RLC channel, the use of RRC message on Uu link, and the IAB MT selecting one of them on its own, respectively.

In the cases of FIGS. 7A and 7B, fic packets need to be transmitted/received through an Xn interface between a master gNB and a secondary gNB, and for this, an f1c transfer message may serve to put in and transmit the f1c packet between the two gNBs.

In the case of FIG. 7A where the f1c traffic is configured to be transmitted through the MCG link, the IAB MT may add the upstream f1c packet to the NR RRC message and transmit the NR RRC message to the master gNB. In this case, the master gNB may extract the f1c packet from the RRC message, add the f1c packet to the f1c transfer message, and transmit the fic transfer message to the secondary gNB. The secondary gNB may receive the f1c transfer message and transmit the f1c packet to the CU. When the CU is going to transmit the f1c packet, it adds the f1c packet to an f1c transfer message and transmit the f1c transfer message to the master gNB, which may, in turn, add the f1c packet to an NR RRC in a DL and transmit the NR RRC to an IAB node.

In the case of FIG. 7B where the f1c traffic is configured to be transmitted through the SCG link, the IAB MT may transmit the f1c packet in the NR RRC to the secondary gNB through SRB3. The secondary gNB may add the received fic packet to the f1c transfer message and transmit the f1c transfer message to the master gNB. The master gNB receives the fic transfer message and forwards the f1c packet to the CU. When the CU is going to transmit the fic packet, it adds the f1c packet to the f1c transfer message and transmit the f1c transfer message to the secondary gNB, which may, in turn, add the f1c packet to an NR RRC message in a DL and forward the NR RRC message to an IAB node through SRB3.

In this case, where the IAB node adds the f1c packet to the NR RRC message and transmits the NR RRC message to the secondary gNB through a split SRB, the secondary gNB may handle decoding up to RLC layer, and transmit a remaining PDCP PDU, instead of the f1c message, to the master gNB. In this case, not the f1c message but a message used for the existing PDCP PDU transmission may be used. Also, in the DL case, the master gNB transmits a PDCP PDU it generates to the secondary gNB, the secondary gNB performs RLC/MAC/PHY layer processing and sends the result to an IAB node on an SCG path of the split SRB, and the IAB may receive only the f1c packet. In other words, when the split SRB is used, the non-donor node to be gone through in the middle may not decode the f1c packet but forward the f1c packet in a PDCP PDU format.

Figure 8:
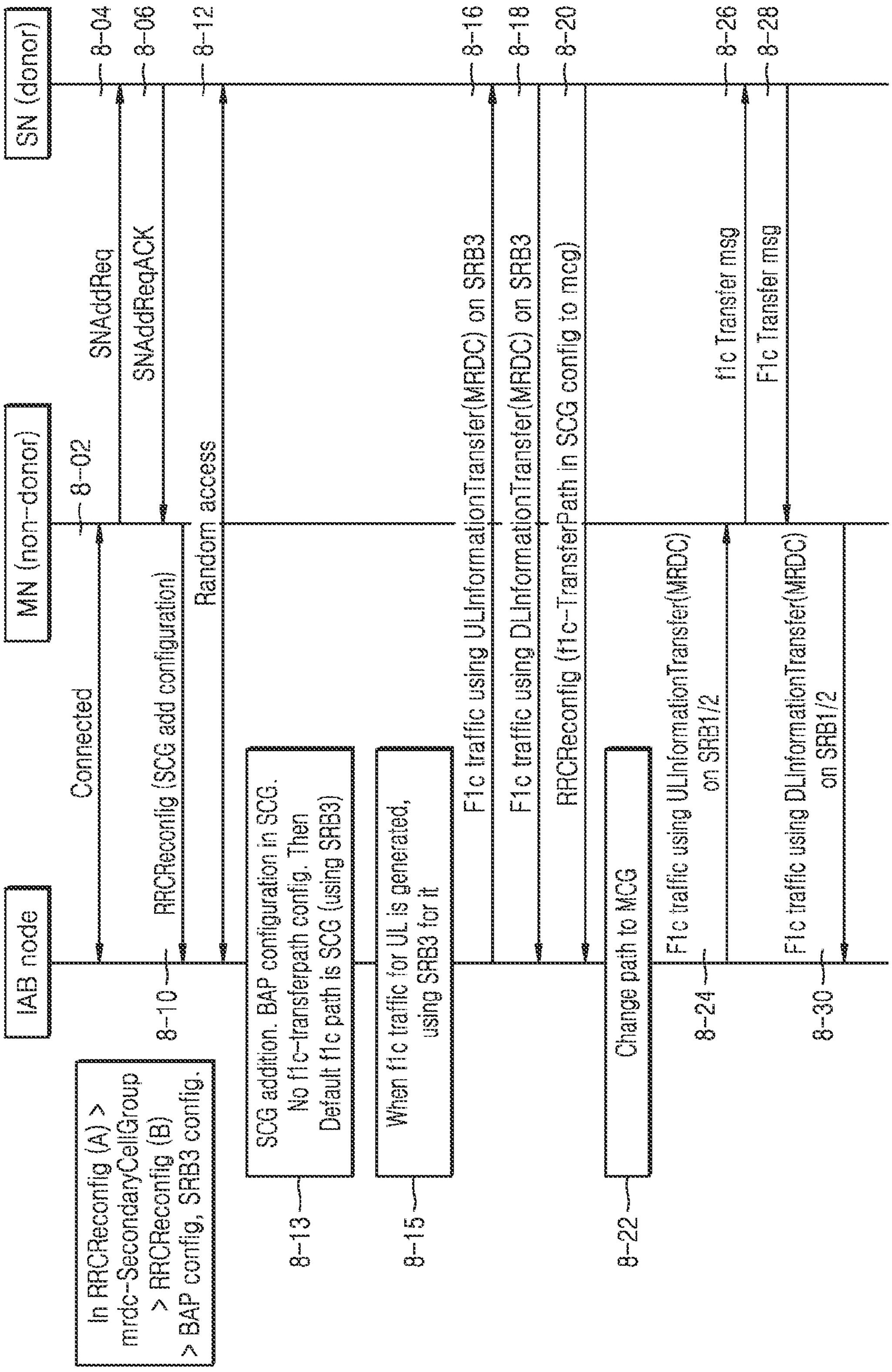
FIG. 8 is a sequence chart of a procedure in which f1 control plane (f1c) traffic of an integrated access and backhaul (IAB) node is transmitted to a control unit (CU) of a donor node through a master node in a dual connection structure comprised of the non-donor master node and the donor secondary node, according to an embodiment of the disclosure.

FIG. 8 is a sequence chart of a procedure in which f1c traffic of an IAB node is transmitted to a CU of a donor node through a master node in a dual connection structure comprised of the non-donor master node and the donor secondary node, according to an embodiment of the disclosure.

Referring to FIG. 8, illustrated is an occasion when SRB3 is used for f1c traffic transmission through an SCG path.

In an embodiment, in operation 8-02, an IAB node and an MN may stay connected. Furthermore, the MN may add an SN according to its decision. For example, in operation 8-04, the MN may transmit a SNAddReq message to an SN, and in operation 8-06, the MN may add the SN by receiving SNAddReqACK from the SN.

In an embodiment, in operation 8-10, the IAB node may receive an SCG addition configuration through RRCReconfiguration. In this case, the configuration information may be included in RRCReconfiguration (B) in an mrdc-SecondaryCellGroup field of an RRCReconfiguration message (A) generated by the MN. Furthermore, BAP configuration and SRB3 setup configuration information may be in the same place. In operation 8-12, the IAB node and the SN may perform a random access procedure.

In operation 8-13, the IAB node may set up an SCG based on the SCG configuration information and set up SRB3. And, based on the BAP configuration information, it may establish a BAP and apply the configuration. In this case, as there is no f1c transfer path configuration information, the IAB node may recognize the default path as the SCG.

Subsequently, when f1c UL traffic is generated in operation 8-15, the IAB node may add the fic UL traffic to an NR RRC message and transmit the NR RRC message by using the SRB3 in operation 8-16. Likewise, downstream traffic may be added to an NR RRC message and transmitted in the NR RRC message to the IAB node through SRB3, in operation 8-18.

In an embodiment of the disclosure, in operation 8-20, from a moment when the donor node sends the f1c transfer path configuration to the MCG, the f1c traffic may be sent through the MCG. For example, when the donor node, which is an SN node, transmits F1-C transferPath configuration to the IAB node, the IAB node may change the path to the MCG based on the received configuration information in operation 8-22. Accordingly, subsequent F1-C traffic may be transmitted through the MCG.

In operation 8-24, when upstream f1c traffic is generated, the IAB node may transmit the f1c traffic to the MN in an NR RRC message through the SRB1 or SRB2, and the MN separates the f1c packet from the message and transmit the f1c packet to the SN in an F1C transfer message on an Xn interface in operation 8-26. The SN may generate and similarly transmit an f1c packet to the MN in an F1c transfer message in operation 8-28, and the MN may transmit the f1c packet to the IAB node in an NR RRC message on the SRB1 or SRB2, in operation 8-30.

Figure 9:
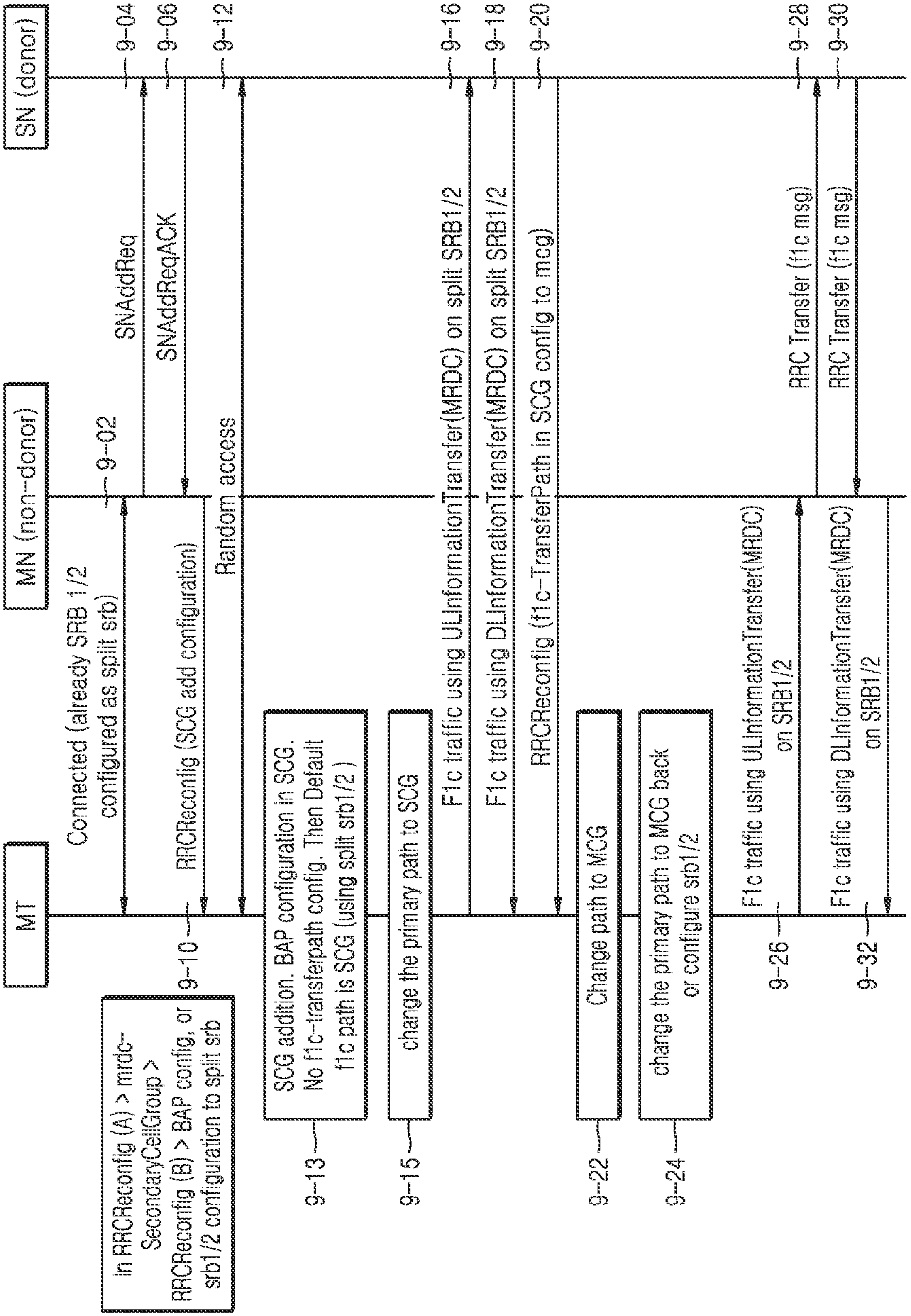
FIG. 9 is a sequence chart of a procedure in which f1c traffic of an IAB node is transmitted to a CU of a donor node through a master node in a dual connection structure comprised of the non-donor master node and the donor secondary node, according to an embodiment of the disclosure.

FIG. 9 is a sequence chart of a procedure in which f1c traffic of an IAB node is transmitted to a CU of a donor node through a master node in a dual connection structure comprised of the non-donor master node and the donor secondary node, according to an embodiment of the disclosure.

Referring to FIG. 9, illustrated is an occasion when a split SRB is used for f1c traffic transmission through an SCG path.

In an embodiment, in operation 9-02, an IAB node and an MN may stay connected. Furthermore, the MN may add an SN according to its decision. For example, in operation 9-04, the MN may transmit a SNAddReq message to an SN, and in operation 9-06, the MN may add the SN by receiving SNAddReqACK from the SN.

In an embodiment, in operation 9-10, the IAB node may receive an SCG addition configuration through RRCReconfiguration. In this case, the configuration information may be included in RRCReconfiguration (B) in an mrdc-SecondaryCellGroup field of an RRCReconfiguration message (A) generated by the MN. Furthermore, BAP configuration information may be in the same place. Split SRB1 or split SRB2 setup configuration information may be included in the RRCReconfiguration message (A). When recognizing that the SN is an IAB donor node and adding the SN, the MN may determine to set up a split SRB. In operation 9-12, the IAB node and the SN may perform a random access procedure. In operation 9-13, the IAB node may set up an SCG based on the SCG configuration information and set up split SRB1 or split SRB2. Furthermore, based on the BAP configuration information, the IAB node may establish a BAP and apply the configuration. In this case, as there is no f1c transfer path configuration information, the IAB node may recognize the default path as the SCG.

Subsequently, when f1c UL traffic is generated, the IAB node may add the f1c UL traffic to an NR RRC message and transmit the NR RRC message by using the split SRB1 or split SRB2. In this case, in operation 9-15, the IAB node may change the primary path for the split SRB for transmission to the SCG.

In an embodiment, when the SRB is not currently configured with pdcp duplication and the primary path has been the MCG, the IAB node may change the path to the SCG only for the corresponding packet transmission and after the change, perform UL transmission in operation 9-16. Likewise, downstream traffic may be added to an NR RRC message and transmitted in the NR RRC message to an IAB node through the split SRB, in operation 9-18. In another embodiment, continuously from the moment when the f1c transfer path is set to the SCG, the IAB node changes the primary path to the SCG and performs UL transmission on the SCG path until the donor node changes the path back to the MCG.

In this case, when the split SRB is used, PDCP PDU transmission between the MN and the SN may occur on an Xn interface.

In an embodiment of the disclosure, in operation 9-20, from a moment when the donor node sends the f1c transfer path configuration to the MCG, the f1c traffic may be transmitted through the MCG. In this case, according to an embodiment where the change is maintained from when the path configuration is received in the previous operation, the IAB node may change the primary path back to the MCG and perform UL transmission through the corresponding split SRB in the current operation. For example, when the donor node, which is an SN node, transmits F1-C transferPath configuration to the IAB node, the IAB node may change the path to the MCG based on the received configuration information in operation 9-22. Accordingly, subsequent F1-C traffic may be transmitted through the MCG. In another embodiment where the change is maintained from when the path configuration is received, the IAB node may change the primary path back to the MCG and perform UL transmission through the corresponding split SRB.

In an embodiment, when upstream f1c traffic is generated, the IAB node may transmit the f1c traffic in an NR RRC message to the MN through the split SRB in operation 9-26, and the MN separates the f1c packet from the message and transmits the f1c packet to the SN in an F1C transfer message on an Xn interface in operation 9-28. The SN may generate and similarly transmit an f1c packet to the MN in an F1c transfer message in operation 9-30, and the MN may transmit the f1c packet to the IAB node in an NR RRC message on the split SRB1 or split SRB2.

Figure 10:
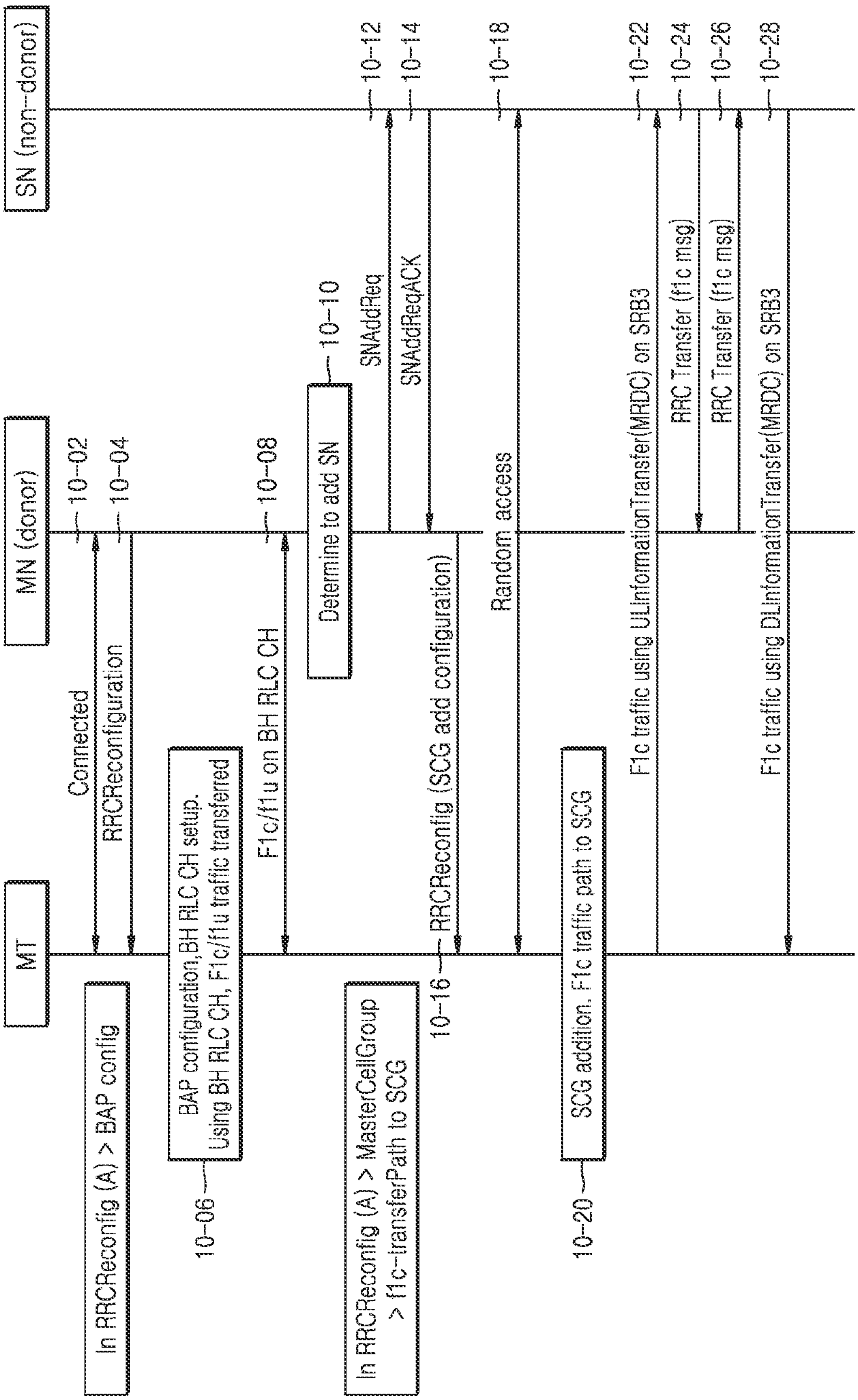
FIG. 10 is a sequence chart of a procedure in which f1c traffic of an IAB node is transmitted to a CU of a donor node through a secondary node in a dual connection structure comprised of the donor master node and the non-donor secondary node, according to an embodiment of the disclosure.

FIG. 10 is a sequence chart of a procedure in which f1c traffic of an IAB node is transmitted to a CU of a donor node through a secondary node in a dual connection structure comprised of the donor master node and the non-donor secondary node, according to an embodiment of the disclosure.

Referring to FIG. 10, illustrated is an occasion when SRB3 is used for transmission of the f1c traffic through an SCG path.

In an embodiment, in operation 10-02, an IAB node and an MN may stay connected. In operation 10-04, the IAB node may receive configuration information from the MN. For example, the configuration information may be RRCReconfiguration.

Furthermore, the RRCReconfiguration message may include BAP configuration information. In operation 10-06, the IAB node that receives the BAP configuration from the MN may set up a BAP entity and apply the configuration information thereto.

Furthermore, the IAB node may set up a BH RLC channel. In operation 10-08, f1c and f1u traffic generated in the IAB DU may be transmitted or received to or from the CU of the MN by using the BH RCL channel.

In an embodiment, the MN may add an SN according to its decision. For example, in operation 10-10, the MN may determine to add an SN. Accordingly, in operation 10-12, the MN may transmit a SNAddReq message to the SN, and in operation 10-14, the MN may receive a SNAddReqACK message from the SN.

In an embodiment of the disclosure, in operation 10-10, the IAB node may receive an SCG addition configuration through RRCReconfiguration. In this case, the configuration information may be included in RRCReconfiguration (B) in an mrdc-SecondaryCellGroup field of an RRCReconfiguration message (A) generated by the MN. Furthermore, SRB3 setup configuration information may be in the same place.

In an embodiment, in operation 10-18, the IAB node may perform a random access procedure with the SN. Furthermore, the IAB node may set up an SCG based on the SCG configuration information and set up SRB3. In an embodiment, the BAP configuration information is originally included in an RRCReconfiguration (A) message generated by the MN, so the default path may be the MCG. When the F1c transfer path configuration information is transmitted as being set to SCG in the master cell group field of the RRCReconfiguration (A) message received from the MN in operation 10-20 while the MCG is used as the default path apart from SCG addition, the IAB node may send the f1c packet on the SCG link.

After this, when upstream f1c traffic is generated, the IAB node may transmit the f1c traffic in an NR RRC message to the SN through SRB3 in operation 10-22. In operation 10-24, the SN may separate the f1c packet from the message and transmit the f1c packet in the F1C transfer message to the MN on the Xn interface. In operation 10-26, the MN may generate an f1c packet and, as described above, transmit the f1c packet in an f1c transfer message to the SN. Furthermore, in operation 10-28, the SN may transmit the f1c packet in an F1-C NR RRC message to an IAB node on SRB3.

Figure 11:
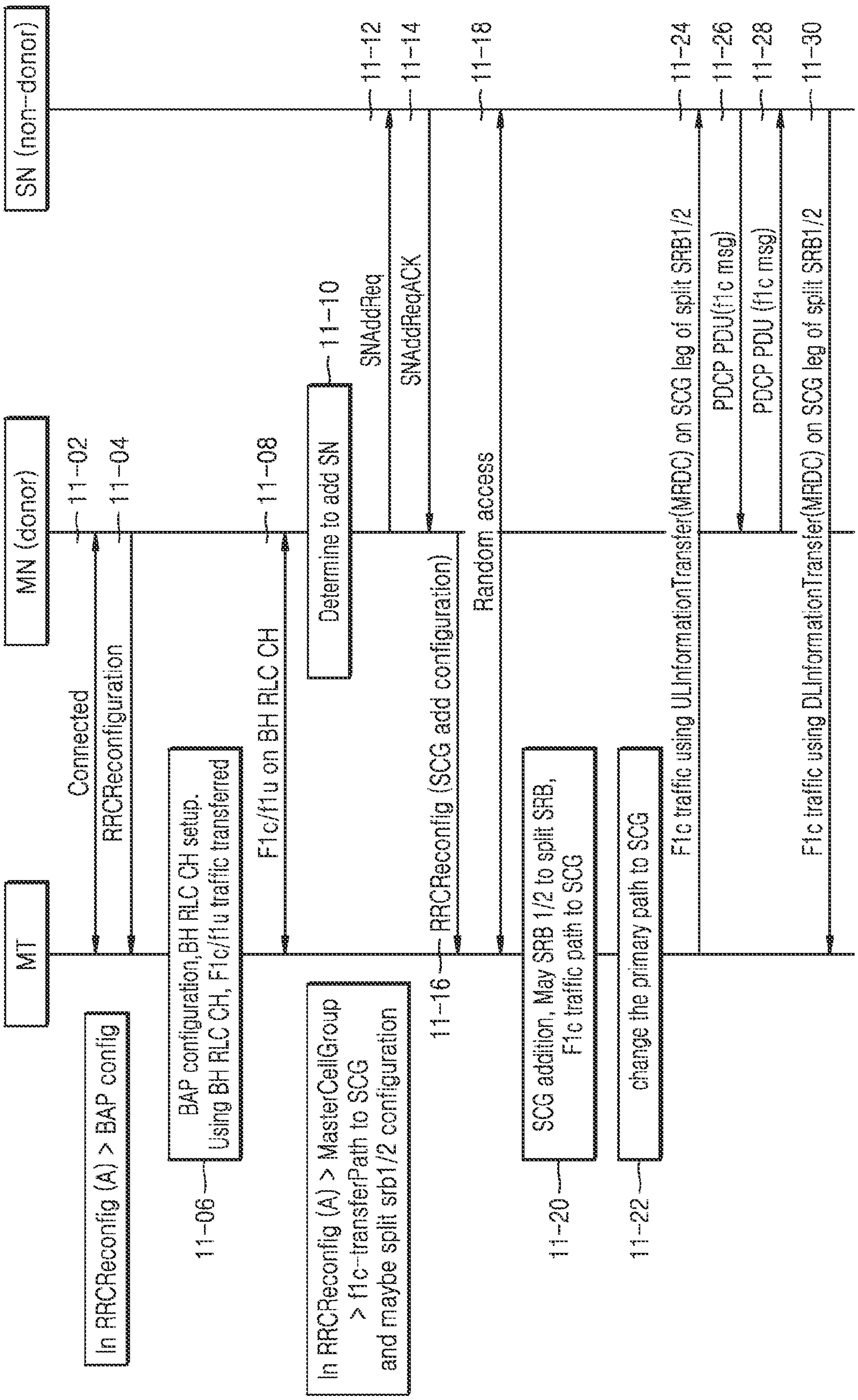
FIG. 11 is a sequence chart of a procedure in which f1c traffic of an IAB node is transmitted to a CU of a donor node through a secondary node in a dual connection structure comprised of the donor master node and the non-donor secondary node, according to an embodiment of the disclosure.

FIG. 11 is a sequence chart of a procedure in which f1c traffic of an IAB node is transmitted to a CU of a donor node through a secondary node in a dual connection structure comprised of the donor master node and the non-donor secondary node, according to an embodiment of the disclosure.

Referring to FIG. 11, a split SRB may be used for f1c traffic transmission through an SCG path.

In an embodiment, in operation 11-02, an IAB node and an MN may stay connected. Furthermore, in operation 11-04, the IAB node may receive configuration information from the MN. For example, the configuration information may be an RRCReconfiguration message. Furthermore, the RRCReconfiguration message may include BAP configuration information. In operation 11-06, the IAB node that receives the BAP configuration from the MN may set up a BAP entity and apply the configuration information thereto. Furthermore, the IAB node may set up a BH RLC channel. In operation 11-08, f1-c and f1-u traffic generated in the IAB DU may be transmitted or received to or from the CU of the MN by using the BH RCL channel.

In an embodiment, the MN may add an SN according to its decision. For example, in operation 11-10, the MN may determine to add an SN. Accordingly, in operation 11-12, the MN may transmit a SNAddReq message to the SN, and in operation 11-14, the MN may receive a SNAddReqACK message from the SN.

In an embodiment, in operation 11-16, the IAB node may receive an SCG addition configuration through RRCReconfiguration. In this case, the configuration information may be included in RRCReconfiguration (B) in an mrdc-SecondaryCellGroup field of an RRCReconfiguration message (A) generated by the MN.

Split SRB1 or split SRB2 setup configuration information may be included in the RRCReconfiguration message (A). For addition of an SN, the MN may determine to set up a split SRB.

In an embodiment, in operation 11-18, the IAB node may perform a random access procedure with the SN. In operation 11-20, the IAB node may set up an SCG based on the SCG configuration information. Furthermore, the IAB node may set up the split SRB1 or split SRB2. The BAP configuration information is originally included in an RRCReconfiguration (A) message generated by the MN, so the default path may be the MCG. When the F1c transfer path configuration information is transmitted as being set to SCG in the master cell group field of the RRCReconfiguration (A) message received from the MN while the MCG is used as the default path apart from SCG addition, the IAB node may send the f1c packet on the SCG link.

In an embodiment, in the subsequent operation 11-24, when f1c UL traffic is generated, the IAB node may transmit the f1c UL traffic in an NR RRC message by using the split SRB1 or split SRB2. For this, the IAB node may change the primary path for the split SRB for transmission to the SCG in operation 11-22.

In an embodiment, when the SRB is not currently configured with pdcp duplication and the primary path has been the MCG, the IAB node may change the path to the SCG only for the corresponding packet transmission and after the change, perform UL transmission. In the same way, downstream traffic may be sent in an NR RRC message to the IAB node through the split SRB.

In another embodiment, continuously from the moment when the f1c transfer path is set to the SCG, the primary path is changed to the SCG and UL transmission may be performed on the SCG path for all the packets until the donor node changes the path back to the MCG.

In this case, when the split SRB is used, PDCP PDU transmission between the MN and the SN may occur on the Xn interface.

In the above example, as the donor node sets the f1c transfer path to a certain value, the RRC message including the f1c traffic generated by the IAB node may be sent on the set path. No matter what value is set by the donor node for the f1c transfer path, it may have no effect on setting of the primary path. Hence, other upstream control messages of the IAB node are still transmitted on the currently set primary path, but the RRC message including the upstream f1c traffic may be transmitted according to the setting of the f1c transfer path.

When an f1c upstream packet of the IAB node is generated while the IAB node is configured with E-UTRAN new radio-dual connectivity (ENDC), the IAB MT may add the f1c to an ULInformationTransfer message of LTE RRC in an octet string and transmit the message.

When mobility such as handover or RRC connection reestablishment occurs before successful delivery of the ULInformationTransfer message is confirmed by a lower layer, the IAB MT needs to notify delivery failure of the ULInformationTransfer message. In this case, what entity receives which failure will now be described with reference to FIG. 12.

Figure 12:
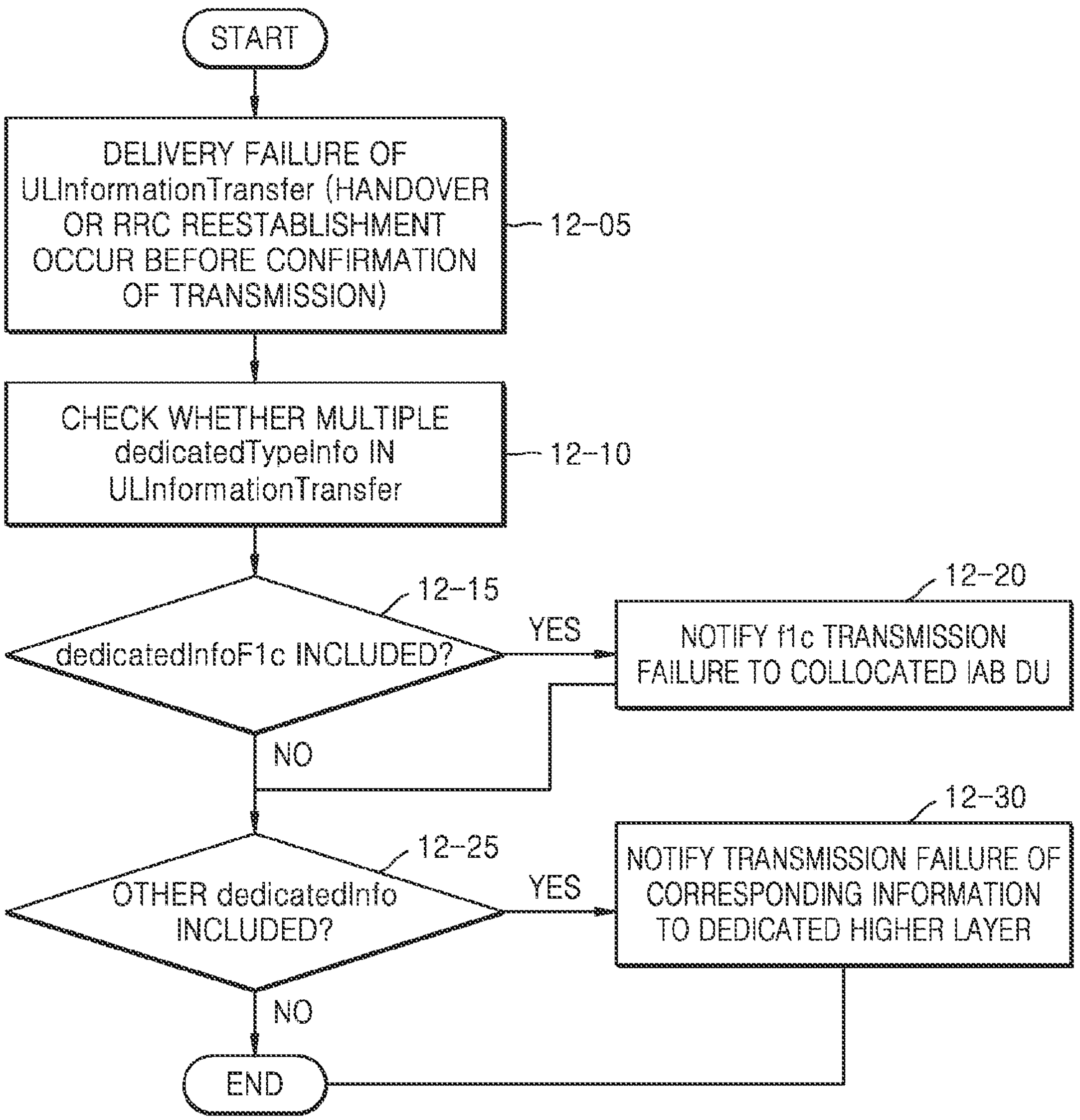
FIG. 12 is a flowchart illustrating an ULInformationTransfer failure handling procedure of an IAB node, according to an embodiment of the disclosure.

FIG. 12 is a flowchart illustrating an ULInformationTransfer failure handling procedure of an IAB node, according to an embodiment of the disclosure.

Referring to FIG. 12, in operation 12-05, the IAB node may determine that transmission of the ULInformationTransfer has failed. For example, when handover, an RRC connection reestablishment procedure, or the like occurs before successful transmission of the ULInformationTransfer message is confirmed by a lower layer, the IAB node may determine that the transmission of ULInformationTransfer has failed. When the transmission of ULInformationTransfer has failed, the IAB node may check whether the failed ULInformationTransfer message includes multiple dedicatedTypeInfo in operation 12-10.

After checking the presence of the multi-message, the IAB node may identify whether dedicatedInfoF1c is included in the multi-message in operation 12-15. In an embodiment, when the multi-message includes the dedicatedInfoF1c, the IAB MT may notify a collocated IAB DU of failure of f1c transmission, in operation 12-20.

In an embodiment, when the multi-message does not include the dedicatedInfoF1c or after the transmission failure is notified in operation 12-20, the IAB node may determine whether other dedicatedInfo is included in operation 12-25. When a different type of dedicatedInfo is included in the multi-message, the IAB node may notify a higher layer corresponding to the dedicated info type of delivery failure of the dedicated info, in operation 12-30.

In another embodiment, when failure handling is performed in the F1c layer, notification of the delivery failure in extra ULInformationTransfer to the higher layer or the IAB DU may not be required. In this case where the delivery failure of ULInformationTransfer is notified to an LTE RRC from a lower layer, when the ULInformationTransfer message includes a dedicated Info field of a type other than the f1c dedicated info, the delivery failure may be notified to a higher layer related with the dedicated info. When the ULInformationTransfer includes the f1c dedicatedInfo field, no extra delivery failure may be notified to an IAB DU or higher layer corresponding to the f1c dedicatedInfo. In other words, when the ULInformationTransfer message includes the f1c dedicated Info, the delivery failure may be notified to a higher layer for dedicated info of a type other than the f1c dedicated info field. For this, when the transmission of ULInformationTransfer fails, the LTE RRC of the UE may figure out the contents and may or may not notify the transmission failure to the higher layer on a certain occasion.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents. Thus, it will be apparent to those ordinary skilled in the art that the disclosure is not limited to the embodiments of the disclosure described, which have been provided only for illustrative purposes. Furthermore, the embodiments may be operated by being combined with one another if necessary. For example, parts of the methods proposed in the disclosure may be combined to operate the BS and the UE. Although the embodiments of the disclosure are proposed based on 5G or NR systems, modifications to the embodiments of the disclosure, which do not deviate from the scope of the disclosure, may be applicable to other systems such as an LTE system, an LTE-A system, an LTE-A-Pro system, etc.

The invention claimed is:

1. A method performed by an integrated access and backhaul (IAB) mobile terminal (MT) in a wireless communication system, the method comprising:

receiving, from a donor node, configuration information indicating a transmission path of at least one of a first F1 control plane (F1-C) packet or a second F1-C packet;

transmitting, to a non-donor node of an IAB node, a first radio resource control (RRC) message including the first F1-C packet, wherein the first F1-C packet is transmitted from the IAB MT to the donor node via the non-donor node; and receiving, from the non-donor node of the IAB node, a second RRC message including the second F1-C packet, wherein the second F1-C packet is transmitted from the donor node to the IAB MT via the non-donor node, wherein in case that the non-donor node is a master node and the donor node is a secondary node, and the first RRC message includes a dedicatedInfofield of a type other than a dedicatedInfoF1c, a transmission failure associated with the first RRC message is informed.

2. The method of claim 1, wherein:

in case that the non-donor node is the master node and the donor node is the secondary node, the first RRC message and the second RRC message are transmitted via a signaling radio bearer (SRB) 2, and in case that the donor node is the master node and the non-donor node is the secondary node, the first RRC message and the second RRC message are transmitted via a split SRB 2.

3. The method of claim 1, wherein the configuration information indicates one of a master cell group (MCG) link path, a secondary cell group (SCG) link path, or both.

4. The method of claim 1, wherein, in case that the first F1-C packet and the second F1-C packet are transmitted based on a backhaul radio link control (RLC) channel among an RRC message and the backhaul RLC channel, the first F1-C packet is transmitted from the IAB MT to the donor node or the second F1-C packet is transmitted from the donor node to the IAB MT.

5. The method of claim 1, further comprising;

in case that the donor node is the master node, the non-donor node is the secondary node, and the IAB MT transmits the first RRC message including the first F1-C packet to the non-donor node of the IAB node, receiving, from the non-donor node of the IAB node, the second F1-C packet based on a packet data convergence protocol (PDCP) protocol data unit (PDU).

6. An integrated access and backhaul (IAB) mobile terminal (MT) in a wireless communication system, the IAB MT comprising:

a transceiver; and at least one processor connected to the transceiver, wherein the at least one processor is configured to:

receive, from a donor node, configuration information indicating a transmission path of at least one of a first F1 control plane (F1-C) packet or a second F1-C packet, transmit, to a non-donor node of an IAB node, a first radio resource control (RRC) message including the first F1-C packet, wherein the first F1-C packet is transmitted from the IAB MT to the donor node via the non-donor node, and receive, from the non-donor node of the IAB node, a second RRC message including a second F1-C packet, wherein the second F1-C packet is transmitted from the donor node to the IAB MT via the non-donor node, wherein in case that the non-donor node is a master node and the donor node is a secondary node, and the first RRC message includes a dedicatedInfofield of a type other than a dedicatedInfoF1c, a transmission failure associated with the first RRC message is informed.

7. The IAB MT of claim 6, wherein:

in case that the non-donor node is the master node and the donor node is the secondary node, the first RRC message and the second RRC message are transmitted via a signaling radio bearer (SRB) 2, and in case that the donor node is the master node and the non-donor node is the secondary node, the first RRC message and the second RRC message are transmitted via a split SRB 2.

8. The IAB MT of claim 6, wherein the first RRC message is a ULInformationTransfer message and the second RRC message is a DLInformationTransfer message.

9. The IAB MT of claim 6, wherein the configuration information indicates one of a master cell group (MCG) link path, a secondary cell group (SCG) link path, or both.

10. The IAB MT of claim 6, wherein in case that the first F1-C packet and the second F1-C packet are transmitted based on a backhaul radio link control (RLC) channel among an RRC message and the backhaul RLC channel, the first F1-C packet is transmitted from the IAB MT to the donor node or the second F1-C packet is transmitted from the donor node to the IAB MT.

11. The IAB MT of claim 6, wherein the at least one processor is further configured to:

in case that the donor node is the master node, the non-donor node is the secondary node, and the IAB MT transmits the first RRC message including the first F1-C packet to the non-donor node of the IAB node, receive, from the non-donor node of the IAB node, the second F1-C packet based on a packet data convergence protocol (PDCP) protocol data unit (PDU).

12. An integrated access and backhaul (IAB) non-donor node in a wireless communication system, the IAB non-donor node comprising:

a transceiver; and at least one processor connected to the transceiver, wherein the at least one processor is configured to:

receive, from an IAB mobile terminal (MT), a first radio resource control (RRC) message including a first F1 control plane (F1-C) packet, transmit, to an IAB donor node, the first F1-C packet, receive, from the IAB donor node, a second F1-C packet, and transmit, to the IAB MT, a second RRC message including the second F1-C packet, wherein configuration information indicating a transmission path of at least one of the first F1-C packet or the second F1-C packet is transmitted from the IAB donor node to the IAB MT, and wherein in case that the non-donor node is a master node and the donor node is a secondary node, and the first RRC message includes a dedicatedInfofield of a type other than a dedicatedInfoF1c, a transmission failure associated with the first RRC message is informed.

13. An integrated access and backhaul (IAB) donor node in a wireless communication system, the IAB donor node comprising:

a transceiver; and at least one processor connected to the transceiver, wherein the at least one processor is configured to:

transmit, to an IAB mobile terminal (MT), configuration information indicating a transmission path of at least one of a first F1 control plane (F1-C) packet or a second F1-C packet, receive, from an IAB non-donor node, the first F1-C packet, and transmit, to the IAB non-donor node, the second F1-C packet, wherein the first F1-C packet is acquired at the IAB non-donor node in case that the IAB non-donor node receives, from the IAB MT, a first radio resource control (RRC) message including the first F1-C packet, wherein a second RRC message including the second F1-C packet is transmitted from the IAB non-donor node to the IAB MT in case that the IAB non-donor node receives the second F1-C packet, and wherein in case that the non-donor node is a master node and the donor node is a secondary node, and the first RRC message includes a dedicatedInfofield of a type other than a dedicatedInfoF1c, a transmission failure associated with the first RRC message is informed.

* * * * *